US009302129B1

(12) United States Patent
Betz et al.

(10) Patent No.: US 9,302,129 B1
(45) Date of Patent: Apr. 5, 2016

(54) TURNTABLE ASSEMBLY FOR A FIRE APPARATUS

(71) Applicant: Oshkosh Corporation, Oshkosh, WI (US)

(72) Inventors: Eric Betz, Clintonville, WI (US); Jennifer Bloemer, DePere, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 14/552,260

(22) Filed: Nov. 24, 2014

(51) Int. Cl.
*A62C 27/00* (2006.01)
*E06C 5/04* (2006.01)
*B62D 21/09* (2006.01)

(52) U.S. Cl.
CPC ................ *A62C 27/00* (2013.01); *B62D 21/09* (2013.01); *E06C 5/04* (2013.01)

(58) Field of Classification Search
CPC ............. A62C 27/00; E06C 5/04; B62D 1/09
See application file for complete search history.

(56) References Cited

U.S. PATENT DOCUMENTS 3,346,052 A * 10/1967 Moore ................... A62C 31/24 169/25
3,675,721 A * 7/1972 Davidson .............. F16L 27/125 169/24
3,770,062 A * 11/1973 Riggs ..................... A62C 31/24 169/24
3,789,869 A * 2/1974 Morris .................... B66C 23/64 137/351
5,368,317 A * 11/1994 McCombs ................ E06C 5/04 182/66.1
5,389,031 A * 2/1995 Sharpe, III ............. A63H 17/08 446/397
5,538,274 A 7/1996 Schmitz et al.
5,820,150 A 10/1998 Archer et al.
5,897,123 A 4/1999 Cherney et al.
6,006,841 A * 12/1999 Hunke ................... A62C 27/00 137/355.2
6,105,984 A 8/2000 Schmitz et al.
6,421,593 B1 7/2002 Kempen et al.
6,516,914 B1 2/2003 Andersen et al.
6,520,494 B1 2/2003 Andersen et al.
6,553,290 B1 4/2003 Pillar
6,561,718 B1 5/2003 Archer et al.
6,755,258 B1 * 6/2004 Hunke ................... A62C 27/00 169/24
6,757,597 B2 6/2004 Yakes et al.
6,764,085 B1 7/2004 Anderson
6,811,161 B1 * 11/2004 Anderson ................. E06C 5/04 182/19
6,860,332 B1 3/2005 Archer et al.
6,882,917 B2 4/2005 Pillar et al.
6,883,815 B2 4/2005 Archer (Continued)

OTHER PUBLICATIONS

U.S. Appl. No. 08/046,623, filed Apr. 14, 1993, Schmitz et al.

(Continued)

*Primary Examiner* — Kevin Hurley
*Assistant Examiner* — Gabriela C Craciun
(74) *Attorney, Agent, or Firm* — Foley & Lardner LLP

(57) ABSTRACT

A quint configuration fire apparatus includes a chassis, a pump and a water tank coupled to the chassis, a body assembly coupled to the chassis and having a storage area configured to receive a ground ladder and a fire hose, a ladder assembly including a plurality of extensible ladder sections, the ladder assembly coupled to the chassis with a turntable, a single front axle coupled to a front end of the chassis, and a single rear axle coupled to a rear end of the chassis. The ladder assembly is extensible to provide a horizontal reach of at least 100 feet and a vertical height of at least 105 feet. The turntable includes a work platform coupled to a subfloor assembly such that a loaded weight of the quint configuration fire apparatus is supportable by the single front axle and the single rear axle.

14 Claims, 22 Drawing Sheets

(56) References Cited

U.S. PATENT DOCUMENTS 6,885,920 B2 4/2005 Yakes et al.
6,909,944 B2 6/2005 Pillar et al.
6,922,615 B2 7/2005 Pillar et al.
6,976,688 B2 12/2005 Archer et al.
6,993,421 B2 1/2006 Pillar et al.
7,006,902 B2 2/2006 Archer et al.
7,024,296 B2 4/2006 Squires et al.
7,055,880 B2 6/2006 Archer
7,072,745 B2 7/2006 Pillar et al.
7,107,129 B2 9/2006 Rowe et al.
7,127,331 B2 10/2006 Pillar et al.
7,162,332 B2 1/2007 Pillar et al.
7,164,977 B2 1/2007 Yakes et al.
7,184,862 B2 2/2007 Pillar et al.
7,184,866 B2 2/2007 Squires et al.
7,234,534 B2 6/2007 Froland et al.
7,254,468 B2 8/2007 Pillar et al.
7,274,976 B2 9/2007 Rowe et al.
7,277,782 B2 10/2007 Yakes et al.
7,302,320 B2 11/2007 Nasr et al.
7,331,586 B2 2/2008 Trinkner et al.
7,379,797 B2 5/2008 Nasr et al.
7,387,348 B2 6/2008 Archer et al.
7,389,826 B2 6/2008 Linsmeier et al.
7,392,122 B2 6/2008 Pillar et al.
7,412,307 B2 8/2008 Pillar et al.
7,439,711 B2 10/2008 Bolton
7,451,028 B2 11/2008 Pillar et al.
7,522,979 B2 4/2009 Pillar
7,555,369 B2 6/2009 Pillar et al.
7,689,332 B2 3/2010 Yakes et al.
7,711,460 B2 5/2010 Yakes et al.
7,715,962 B2 5/2010 Rowe et al.
7,725,225 B2 5/2010 Pillar et al.
7,729,831 B2 6/2010 Pillar et al.
7,756,621 B2 7/2010 Pillar et al.
7,784,554 B2 8/2010 Grady et al.
7,792,618 B2 9/2010 Quigley et al.
7,792,949 B2 9/2010 Tewari et al.
7,835,838 B2 11/2010 Pillar et al.
7,848,857 B2 12/2010 Nasr et al.
7,874,373 B2 1/2011 Morrow et al.
8,000,850 B2 8/2011 Nasr et al.
8,095,247 B2 1/2012 Pillar et al.
8,201,656 B2 6/2012 Archer et al.
8,376,719 B2 2/2013 Grady et al.
8,413,764 B1 * 4/2013 Cohen ....................... E06C 7/18 182/62.5
8,739,892 B2 6/2014 Moore et al.
8,839,902 B1 9/2014 Archer et al.
2003/0158635 A1 8/2003 Pillar et al.
2003/0195680 A1 10/2003 Pillar
2004/0133319 A1 7/2004 Pillar et al.
2005/0234622 A1 * 10/2005 Pillar ..................... A62C 27/00 701/41
2005/0236226 A1 * 10/2005 Salmi ........................ E06C 5/04 182/65.1
2006/0021764 A1 2/2006 Archer et al.
2006/0022001 A1 2/2006 Linsmeier et al.
2006/0032701 A1 2/2006 Linsmeier et al.
2006/0032702 A1 2/2006 Linsmeier et al.
2006/0070845 A1 * 4/2006 Crookston ............. B65G 21/14 198/312
2006/0086566 A1 4/2006 Linsmeier et al.
2006/0213672 A1 * 9/2006 Mohr ....................... A62C 3/02 169/24
2007/0256842 A1 * 11/2007 Mohr ..................... A62C 27/00 169/24
2007/0284156 A1 * 12/2007 Grady .................... A62C 27/00 180/53.8
2008/0059030 A1 3/2008 Quigley et al.
2008/0099212 A1 * 5/2008 Do ......................... A62C 27/00 169/24
2008/0103651 A1 5/2008 Pillar et al.
2008/0215700 A1 9/2008 Pillar et al.
2012/0193109 A1 * 8/2012 Moore .................. A62C 27/00 169/24
2014/0048353 A1 * 2/2014 Ellis ..................... A62B 35/005 182/241
2014/0238704 A1 8/2014 Moore et al.
2014/0334169 A1 * 11/2014 Ewert .................... A62C 27/00 362/485
2015/0096835 A1 * 4/2015 Hong ........................ E06C 5/42 182/66.2
2015/0120152 A1 * 4/2015 Lauterjung ............... E06C 5/18 701/49
2015/0273252 A1 * 10/2015 Lenz, Jr. ................ A62C 27/00 182/17
2015/0273253 A1 * 10/2015 Lenz, Jr. ................ A62C 27/00 280/4

OTHER PUBLICATIONS

U.S. Appl. No. 09/123,804, filed Jul. 28, 1998, Archer et al.
U.S. Appl. No. 09/364,690, filed Jul. 30, 1999, Kempen et al.
U.S. Appl. No. 10/171,075, filed Jun. 13, 2002, Archer et al.
U.S. Appl. No. 29/162,282, filed Jun. 13, 2002, Archer et al.
U.S. Appl. No. 29/162,344, filed Jun. 13, 2002, Archer et al.
Anonymous, "New truck for Lincolnshire-Riverwoods," Chicago Area Fire Departments, Dec. 6, 2010, Retrieved from the Internet at http://chicagoareafire.com/blog/2010/12/06/ on Jan. 26, 2016, 5 pages as printed.
Anonymous, "Problems with single axle aerial trucks," Firehouse, Dec. 2, 2009, Retrieved from the Internet at http://www.firehouse.com/forums/t111822/ on Jan. 25, 2016, 15 pages as printed.
Anonymous, "Raptor Aerials," Rosenbauer, Oct. 2, 2014, Retrieved from the Internet at https://web.archive.org/web/20141002023939/http://rosenbaueramerica.com/media/documents/pdf/raptor_eng.pdf on Jan. 25, 2016, 6 pages as printed.
Anonymous, "Viper Aerials," Rosenbauer, Oct. 2, 2014, Retrieved from the Internet at https://web.archive.org/web/20141002023939/http://rosenbaueramerica.com/media/documents/pdf/viper_eng.pdf on Jan. 25, 2016, 8 pages as printed.
International Search Report and Written Opinion for PCT Application No. PCT/US2015/060034, mail date Feb. 4, 2016, 12 pages.

* cited by examiner 302
320
304
304
39
340
360
200

200
205
203
56
301
358
351
372
202
303
300

TURNTABLE ASSEMBLY FOR A FIRE APPARATUS

CROSS-REFERENCE TO RELATED PATENT APPLICATIONS

This application is related to U.S. application Ser. No. 14/552,240, titled "Aerial Ladder for a Fire Apparatus," filed Nov. 24, 2014; U.S. application Ser. No. 14/552,252, titled "Quint Configuration Fire Apparatus," filed Nov. 24, 2014; U.S. application Ser. No. 14/552,275, titled "Ladder Assembly for a Fire Apparatus," filed Nov. 24, 2014; U.S. application Ser. No. 14/552,283, titled "Pedestal and Torque Box Assembly for a Fire Apparatus," filed Nov. 24, 2014; and U.S. application Ser. No. 14/552,293, titled "Outrigger Assembly for a Fire Apparatus," filed Nov. 24, 2014, all of which are incorporated herein by reference in their entireties.

BACKGROUND

A quint configuration fire apparatus (e.g., a fire truck, etc.) includes an aerial ladder, a water tank, ground ladders, a water pump, and hose storage. Aerial ladders may be classified according to their horizontal reach and vertical extension height. Traditionally, weight is added to the fire apparatus (e.g., by making the various components heavier or larger, etc.) in order to increase the horizontal reach or vertical extension height of the aerial ladder. Traditional quint configuration fire trucks have included a second rear axle to carry the weight required to provide the desired aerial ladder horizontal reach and vertical extension height. Such vehicles can therefore be more heavy, difficult to maneuver, and expensive to manufacture.

SUMMARY

One embodiment relates to a quint configuration fire apparatus. The quint configuration fire apparatus includes a chassis, a pump and a water tank coupled to the chassis, a body assembly coupled to the chassis and having a storage area configured to receive a ground ladder and a fire hose, a ladder assembly including a plurality of extensible ladder sections, the ladder assembly coupled to the chassis with a turntable, a single front axle coupled to a front end of the chassis, and a single rear axle coupled to a rear end of the chassis. The ladder assembly is extensible to provide a horizontal reach of at least 100 feet and a vertical height of at least 105 feet. The turntable includes a work platform coupled to a subfloor assembly such that a loaded weight of the quint configuration fire apparatus is supportable by the single front axle and the single rear axle.

Another embodiment relates to a fire apparatus. The fire apparatus includes a chassis, a body assembly coupled to the chassis and configured to receive a ground ladder, a fire hose, a pump, and a water tank, a ladder assembly including a plurality of extensible ladder sections, the ladder assembly coupled to the chassis with a turntable, a single front axle coupled to a front end of the chassis, and a single rear axle coupled to a rear end of the chassis. The ladder assembly is extensible to provide a horizontal reach of at least 100 feet. The turntable includes a work platform coupled to a subfloor assembly such that a loaded weight of the fire apparatus is supportable by the single front axle and the single rear axle.

Another embodiment relates to a method of manufacturing a quint configuration fire apparatus. The method includes providing a chassis, coupling a body assembly to the chassis, the body assembly having a storage area configured to receive a ground ladder and a fire hose, positioning a pump within a pump house of the body assembly, disposing a water tank within the body assembly, pivotally coupling a ladder assembly to the chassis with a turntable, the turntable including a work platform coupled to a subfloor assembly, and supporting a weight of at least the chassis, the body assembly, the pump, the water tank, the ladder assembly, the ground ladder, the fire hose, and the turntable with a single front axle and a single rear axle. The ladder assembly is extensible to provide a horizontal reach of at least 100 feet.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
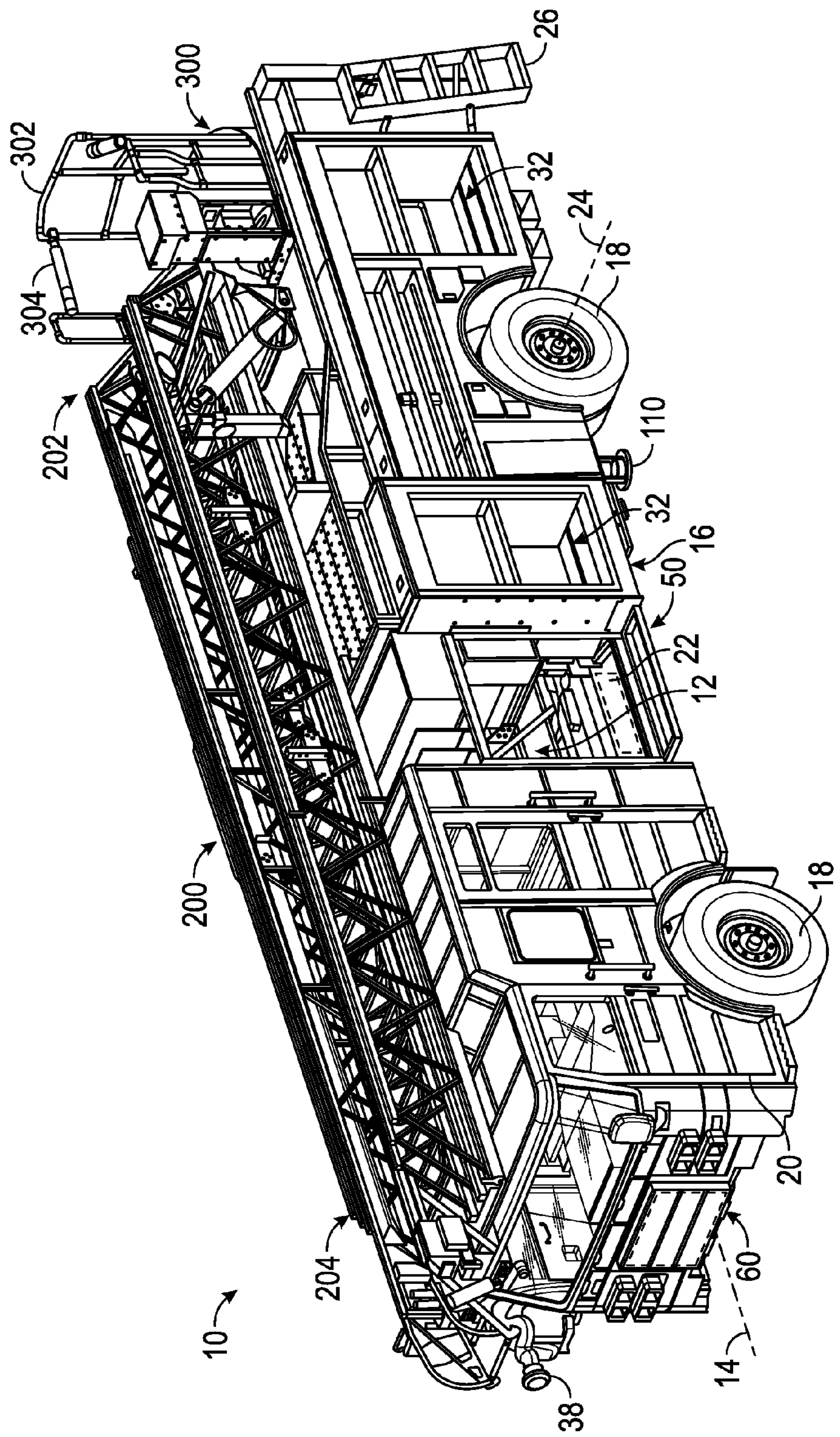
FIG. 1 is a front perspective view of a fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a ladder assembly is coupled to a chassis of a quint configuration fire apparatus with a turntable. In one embodiment, the turntable includes a work platform coupled to a subfloor assembly such that a loaded weight of the quint configuration fire apparatus is supportable by a single front axle and a single rear axle. The loaded weight of the quint configuration fire apparatus may include the gross weight (e.g., total weight, combined weight, etc.) of various components (e.g., chassis, water tank, water, emergency response personnel, turntable, etc.) without the weight of the axles (e.g., a single front axle, a single rear axle, etc.). The loaded weight may be supportable by a single front axle and a single rear axle (e.g., without overcoming a gross axle weight rating associated with either of the single front axle or the single rear axle, etc.).

While some traditional quint configuration fire trucks have a ladder assembly mounted on a single rear axle chassis, the ladder assembly of such fire trucks traditionally has a vertical extension height of 75-80 feet and 67-72 feet of horizontal reach. Vertical extension height may include the distance from the upper-most rung of the ladder assembly to the ground when the ladder assembly is fully extended. Reach may include the horizontal distance from the point of rotation (e.g., point of connection of a ladder assembly to a fire apparatus, etc.) to the furthest rung when the ladder assembly is extended. Increasing vertical extension height or horizontal reach is traditionally achieved by increasing the weight of various components (e.g., the aerial ladder assembly, the turntable, etc.). The increased weight, in turn, is traditionally carried by a requisite tandem rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. According to an exemplary embodiment, the aerial ladder assembly of the quint configuration fire apparatus is operable at a vertical extension height of at least 95 feet (e.g., 105 feet, 107 feet, etc.) and at least 90 feet (e.g., at least 100 feet, etc.) of horizontal reach with a tip capacity of at least 750 pounds. The weight of the chassis and other components is supported by a single rear axle chassis, thereby reducing cost and increasing maneuverability relative to traditional vehicles.

According to the exemplary embodiment shown in FIGS. 1-12, a vehicle, shown as a fire apparatus 10, includes a chassis, shown as a frame 12, that defines a longitudinal axis 14. A body assembly, shown as rear section 16, axles 18, and a cab assembly, shown as front cabin 20, are coupled to the frame 12. In one embodiment, the longitudinal axis 14 extends along a direction defined by at least one of a first frame rail 11 and a second frame rail 13 of the frame 12 (e.g., front-to-back, etc.).

Referring to the exemplary embodiment shown in FIG. 1, the front cabin 20 is positioned forward of the rear section 16 (e.g., with respect to a forward direction of travel for the vehicle along the longitudinal axis 14, etc.). According to an alternative embodiment, the cab assembly may be positioned behind the rear section 16 (e.g., with respect to a forward direction of travel for the vehicle along the longitudinal axis 14, etc.). The cab assembly may be positioned behind the rear section 16 on, by way of example, a rear tiller fire apparatus. In some embodiments, the fire apparatus 10 is a ladder truck with a front portion that includes the front cabin 20 pivotally coupled to a rear portion that includes the rear section 16.

Figure 2:
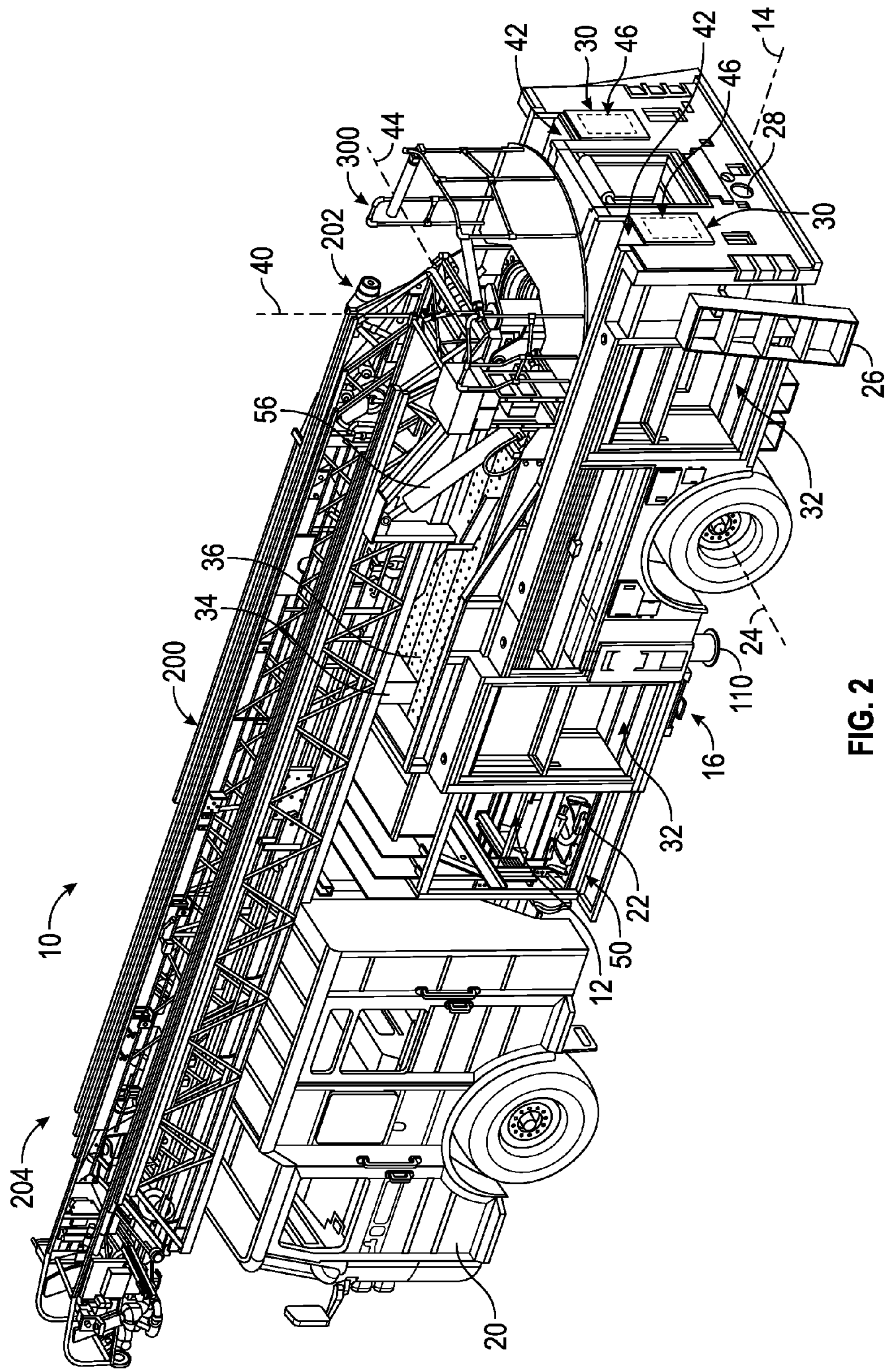
FIG. 2 is a rear perspective view of the fire apparatus of FIG. 1, according to an exemplary embodiment.
Figure 8:
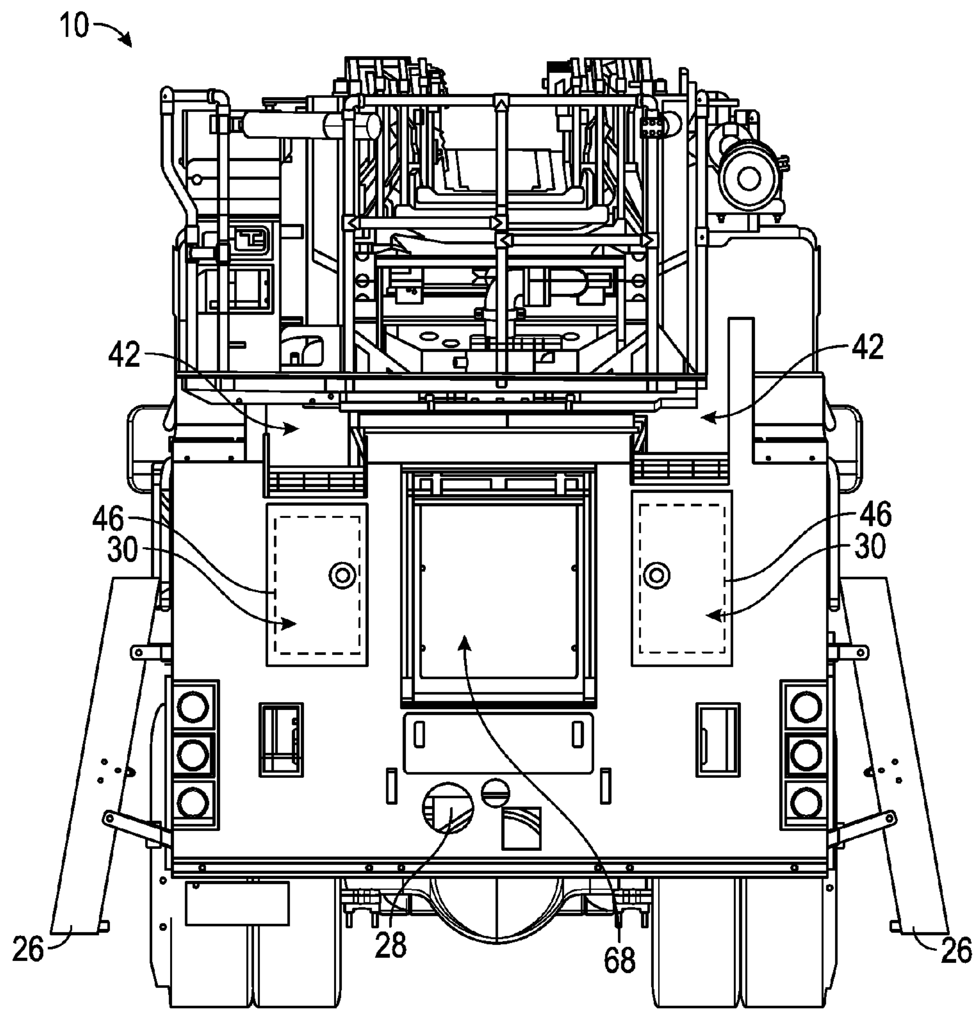
FIG. 8 is a rear view of the fire apparatus of FIG. 1, according to an exemplary embodiment.
Figure 9:
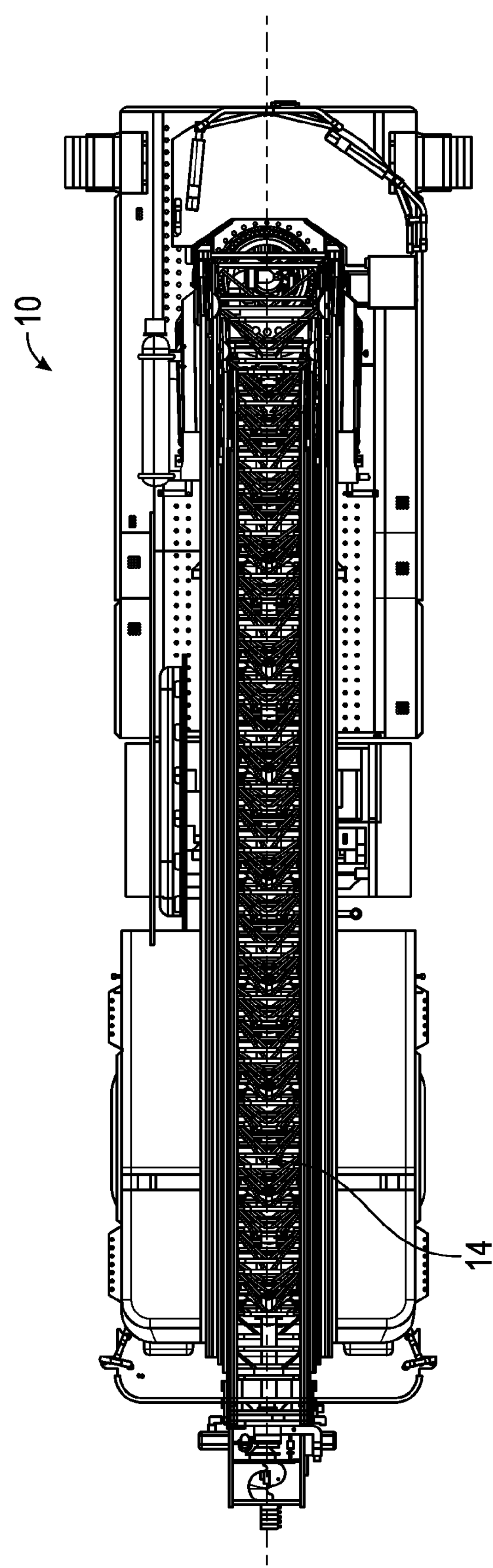
FIG. 9 is a top view of the fire apparatus of FIG. 1, according to an exemplary embodiment.

As shown in FIGS. 2 and 8, the fire apparatus 10 also includes ground ladders 46. The ground ladders 46 are stored within compartments that are closed with doors 30. As shown in FIGS. 2 and 8, the fire apparatus 10 includes two storage compartments and doors 30, each to store one or more individual ground ladders 46. In other embodiments, only one storage compartment and door 30 is included to store one or more ground ladders 46. In still other embodiments, three or more storage compartments and doors 30 are included to store three or more ground ladders 46. As shown in FIGS. 2 and 8, a hose chute 42 is provided on each lateral side at the rear of the fire apparatus 10. The hose chutes 42 define a passageway where one or more hoses may be disposed once pulled from a hose storage location, shown as hose storage platform 36. The fire apparatus 10 includes additional storage, shown as storage compartments 32 and 68, to store miscellaneous items and gear used by emergency response personnel (e.g., helmets, axes, oxygen tanks, medical kits, etc.).

Figure 7:
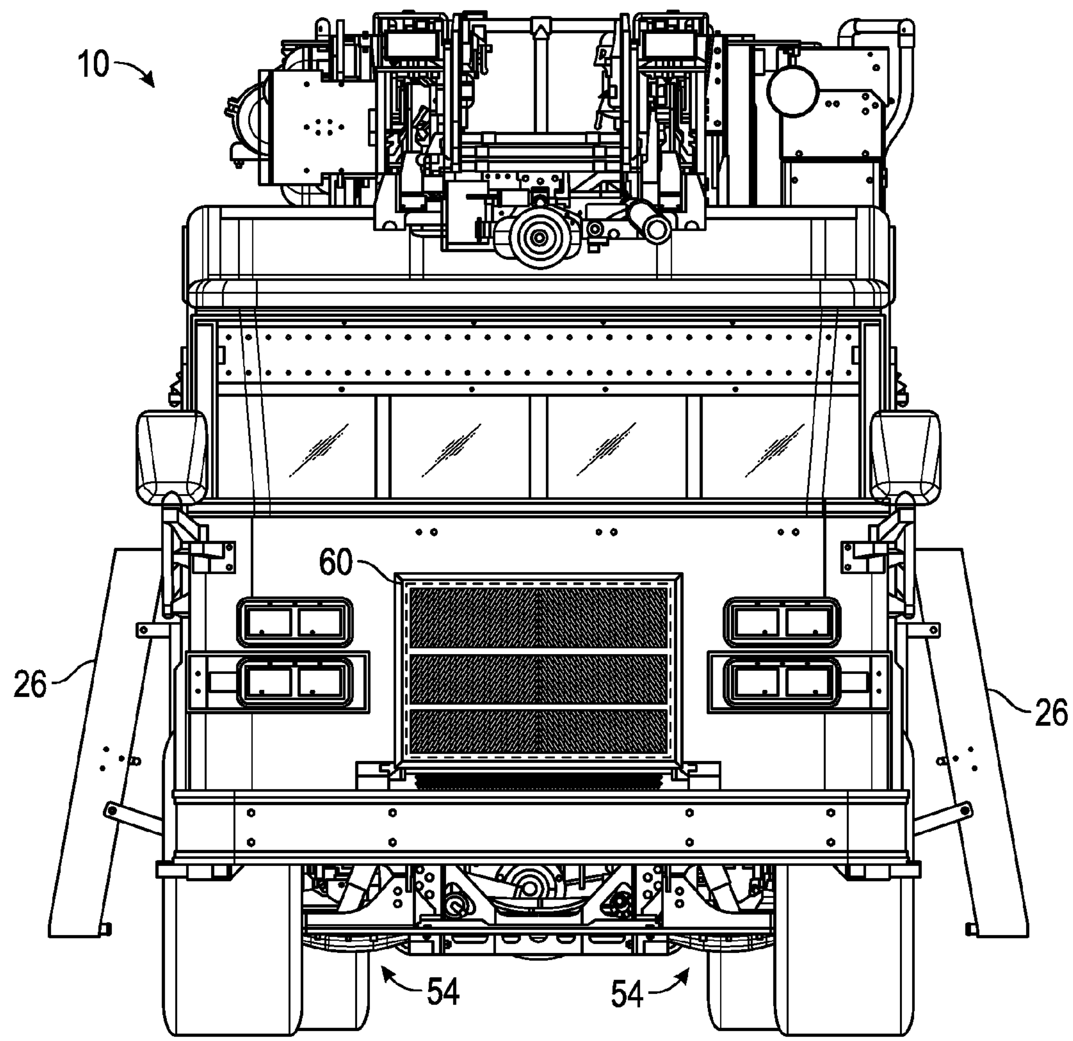
FIG. 7 is a front view of the fire apparatus of FIG. 1, according to an exemplary embodiment.

As shown in FIGS. 1 and 7, the fire apparatus 10 includes an engine 60. In one embodiment, the engine 60 is coupled to the frame 12. According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the fire apparatus 10. According to an exemplary embodiment, the engine 60 is a compression-ignition internal combustion engine that utilizes diesel fuel. In alternative embodiments, the engine 60 is another type of device (e.g., spark-ignition engine, fuel cell, electric motor, etc.) that is otherwise powered (e.g., with gasoline, compressed natural gas, hydrogen, electricity, etc.).

As shown in FIGS. 1-2, the fire apparatus 10 is a quint configuration fire truck that includes a ladder assembly, shown as aerial ladder assembly 200, and a turntable assembly, shown as turntable 300. The aerial ladder assembly 200 includes a first end 202 (e.g., base end, proximal end, pivot end, etc.) and a second end 204 (e.g., free end, distal end, platform end, implement end, etc.). As shown in FIGS. 1-2, the aerial ladder assembly 200 includes a plurality of ladder sections. In some embodiments, the plurality of sections of the aerial ladder assembly 200 is extendable. An actuator may selectively reconfigure the aerial ladder assembly 200 between an extended configuration and a retracted configuration. By way of example, aerial ladder assembly 200 may include a plurality of nesting sections that telescope with respect to one another. In the extended configuration (e.g., deployed position, use position, etc.), the aerial ladder assembly 200 is lengthened, and the second end 204 is extended away from the first end 202. In the retracted configuration (e.g., storage position, transport position, etc.), the aerial ladder assembly 200 is shortened, and the second end 204 is withdrawn towards the first end 202.

According to an exemplary embodiment, the first end 202 of the aerial ladder assembly 200 is coupled to the frame 12. By way of example, aerial ladder assembly 200 may be directly coupled to frame 12 or indirectly coupled to frame 12 (e.g., with an intermediate superstructure, etc.). As shown in FIGS. 1-2, the first end 202 of the aerial ladder assembly 200 is coupled to the turntable 300. The turntable 300 may be directly or indirectly coupled to the frame 12 (e.g., with an intermediate superstructure, via rear section 16, etc.). As shown in FIG. 1, the turntable 300 includes a railing assembly, shown as hand rails 302, and guard rails, shown as guard rails 304. The hand rails 302 provide support for operators aboard the turntable 300. The guard rails 304 are coupled to the hand rails 302 and provide two entrances to the turntable 300. An operator may provide a force to rotate the guard rails 304 open and gain access to the turntable 300. In the embodiment shown in FIG. 2, the turntable 300 rotates relative to the frame 12 about a generally vertical axis 40. According to an exemplary embodiment, the turntable 300 is rotatable a full 360 degrees relative to the frame 12. In other embodiments, the rotation of the turntable 300 relative to the frame 12 is limited to a range of less than 360 degrees, or the turntable 300 is fixed relative to the frame 12. As shown in FIGS. 1-4, the rear section 16 includes a pair of ladders 26 positioned on opposing lateral sides of the fire apparatus 10. As shown in FIGS. 1-2, the ladders 26 are coupled to the rear section 16 with hinges. An operator (e.g., a fire fighter, etc.) may access the turntable 300 by climbing either one of the ladders 26 and entering through the guard rails 304. According to the exemplary embodiment shown in FIGS. 1-2, the turntable 300 is positioned at the rear end of the rear section 16 (e.g., rear mount, etc.). In other embodiments, the turntable 300 is positioned at the front end of the rear section 16, proximate the front cabin 20 (e.g., mid mount, etc.). In still other embodiments, the turntable 300 is disposed along front cabin 20 (e.g., front mount, etc.).

According to the exemplary embodiment shown in FIGS. 1-2, the first end 202 of the aerial ladder assembly 200 is pivotally coupled to the turntable 300. An actuator, shown as cylinder 56, is positioned to rotate the aerial ladder assembly 200 about a horizontal axis 44. The actuator may be a linear actuator, a rotary actuator, or still another type of device and may be powered hydraulically, electrically, or still otherwise powered. In one embodiment, aerial ladder assembly 200 is rotatable between a lowered position (e.g., the position shown in FIG. 1, etc.) and a raised position. The aerial ladder assembly 200 may be generally horizontal or an angle (e.g., 10 degrees, etc.) below the horizontal when disposed in the lowered position (e.g., a stored position, etc.). In one embodiment, extension and retraction of cylinders 56 rotates aerial ladder assembly 200 about the horizontal axis 44 and raises or lowers, respectively, the second end 204 of aerial ladder assembly 200. In the raised position, the aerial ladder assembly 200 allows access between the ground and an elevated height for a fire fighter or a person being aided by the fire fighter.

Figure 5:
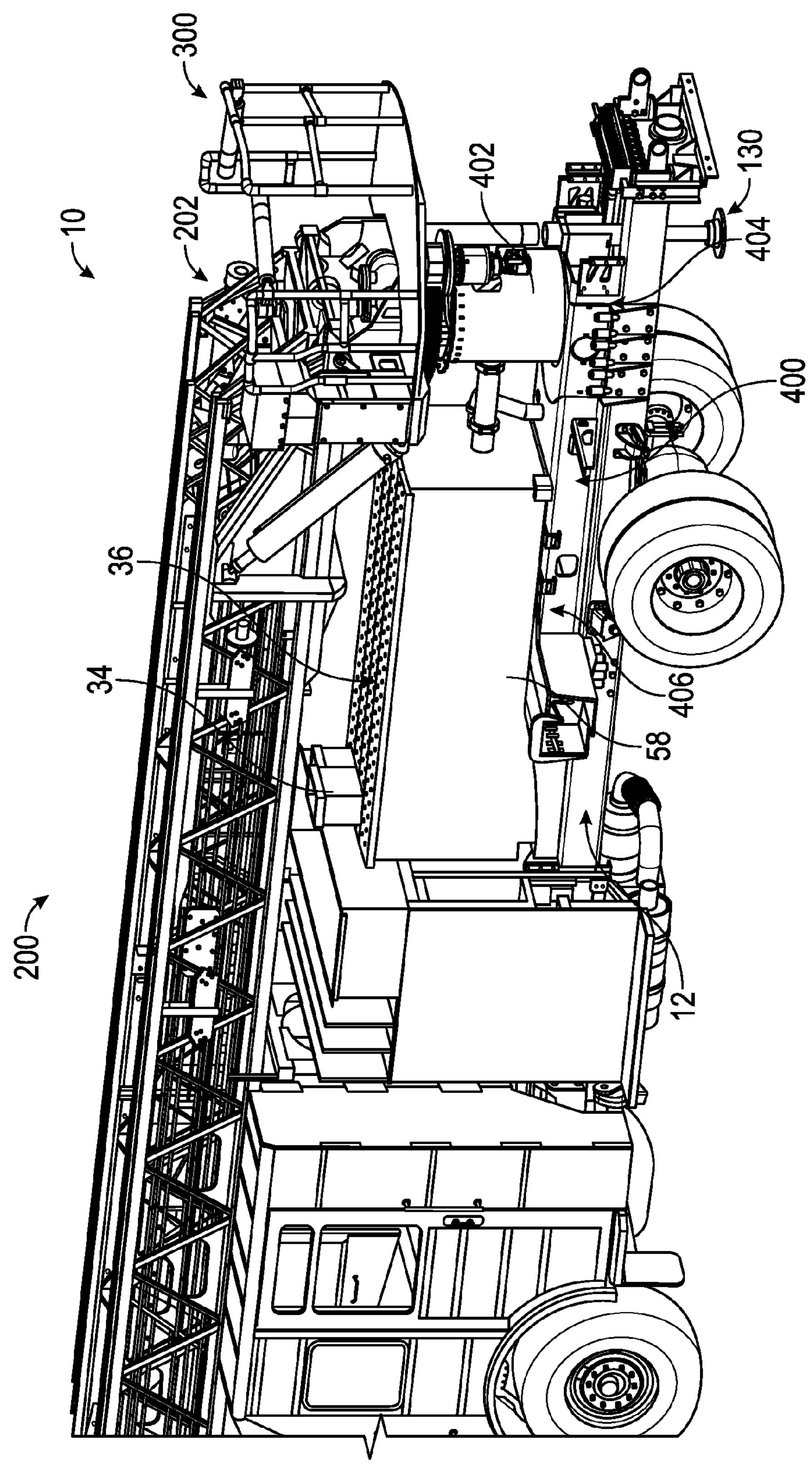
FIG. 5 is a rear perspective view of a water tank of the fire apparatus of FIG. 1, according to an exemplary embodiment.

According to the exemplary embodiment shown in FIG. 5, a reservoir, shown as water tank 58, is coupled to the frame 12 with a superstructure. In one embodiment, the water tank 58 is located within the rear section 16 and below the hose storage platform 36. As shown in FIG. 5, the water tank 58 is coupled to the frame 12 with a tubular component, shown as torque box 400. In one embodiment, the water tank 58 stores at least 500 gallons of water. In other embodiments, the reservoir stores another firefighting agent (e.g., foam, etc.). According to the exemplary embodiment shown in FIGS. 2 and 5, the water tank 58 is filled with a fill dome, shown as fill dome 34.

As shown in FIGS. 1-2, the fire apparatus 10 includes a pump house, shown as pump house 50. A pump 22 may be disposed within the pump house 50. By way of example, the pump house 50 may include a pump panel having an inlet for the entrance of water from an external source (e.g., a fire hydrant, etc.). As shown in FIG. 2, an auxiliary inlet, shown as inlet 28, is provided at the rear of the fire apparatus 10. The pump house 50 may include an outlet configured to engage a hose. The pump 22 may pump fluid through the hose to extinguish a fire (e.g., water from the inlet of the pump house 50, water from the inlet 28, water stored in the water tank 58, etc.).

Referring still to the exemplary embodiment shown in FIGS. 1-2, an implement, shown as nozzle 38 (e.g., deluge gun, water cannon, deck gun, etc.), is disposed at the second end 204 of the aerial ladder assembly 200. The nozzle 38 is connected to a water source (e.g., the water tank 58, an external source, etc.) via an intermediate conduit extending along the aerial ladder assembly 200 (e.g., along the side of the aerial ladder assembly 200, beneath the aerial ladder assembly 200, in a channel provided in the aerial ladder assembly 200, etc.). By pivoting the aerial ladder assembly 200 into the raised position, the nozzle 38 may be elevated to expel water from a higher elevation to facilitate suppressing a fire. In some embodiments, the second end 204 of the aerial ladder assembly 200 includes a basket. The basket may be configured to hold at least one of fire fighters and persons being aided by the fire fighters. The basket provides a platform from which a fire fighter may complete various tasks (e.g., operate the nozzle 38, create ventilation, overhaul a burned area, perform a rescue operation, etc.).

Figure 3:
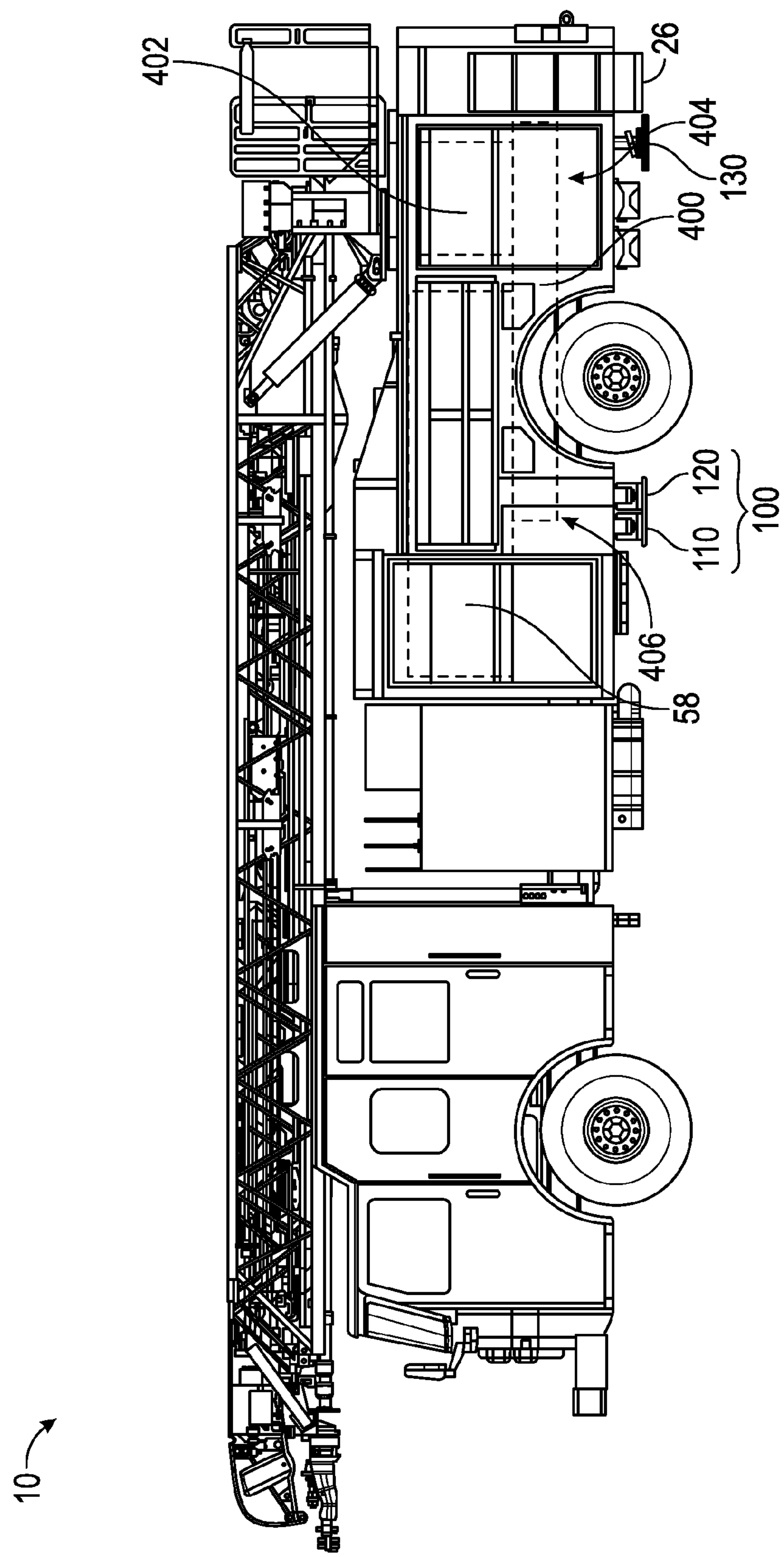
FIG. 3 is a left side view of the fire apparatus of FIG. 1, according to an exemplary embodiment.
Figure 4:
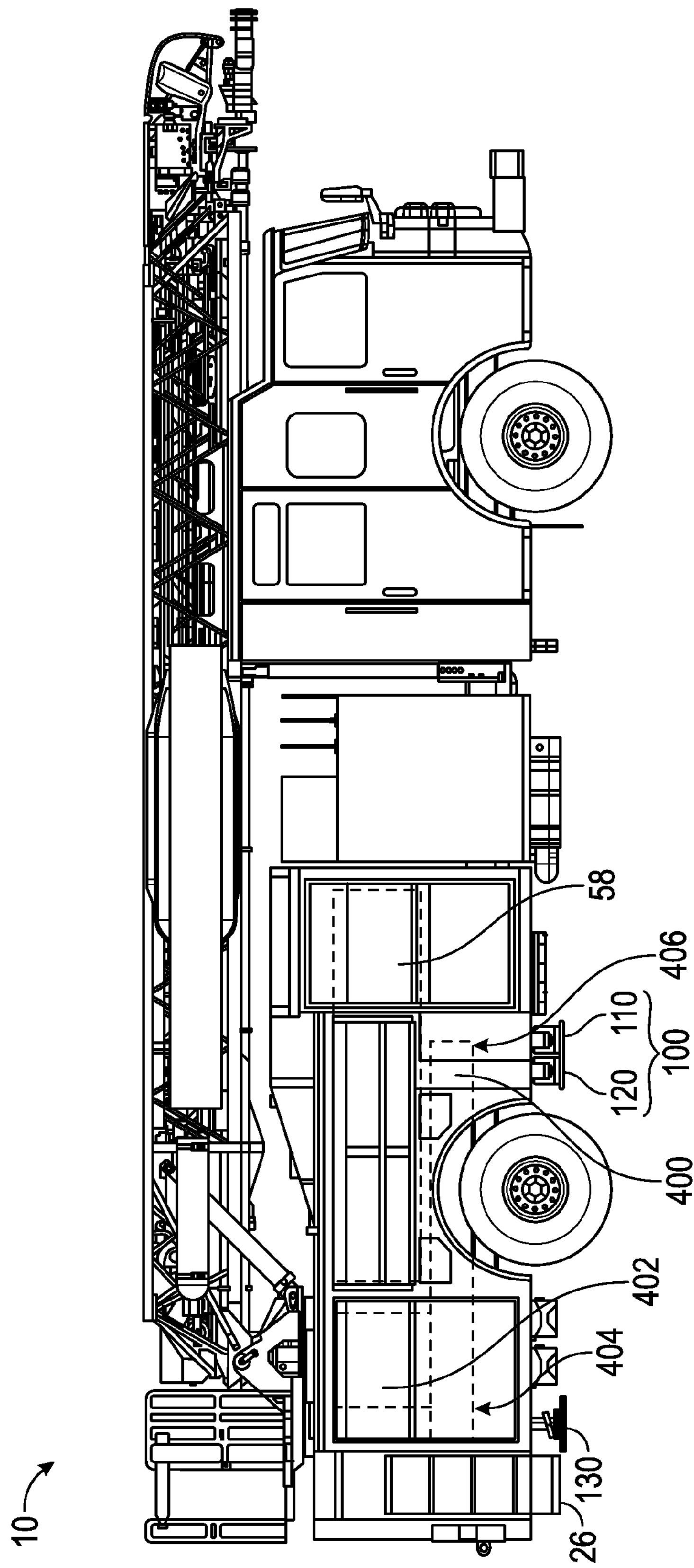
FIG. 4 is a right side view of the fire apparatus of FIG. 1, according to an exemplary embodiment.
Figure 6:
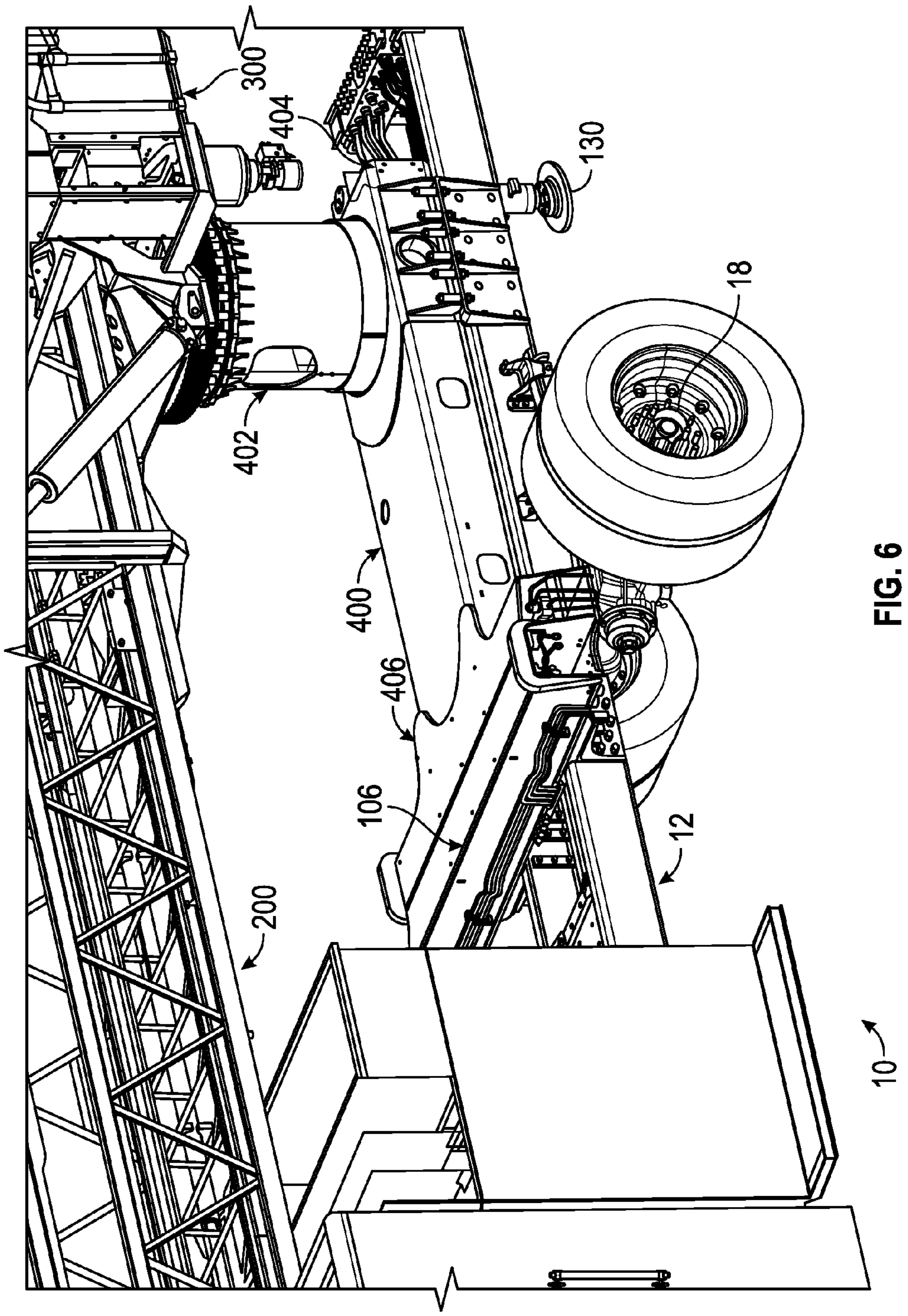
FIG. 6 is a front perspective view of various internal components of the fire apparatus of FIG. 1, according to an exemplary embodiment.

According to the exemplary embodiment shown in FIGS. 5-6, the torque box 400 is coupled to the frame 12. In one embodiment, the torque box 400 extends the full width between the lateral outsides of the first frame rail 11 and the second frame rail 13 of the frame 12. The torque box 400 includes a body portion having a first end 404 and a second end 406. As shown in FIG. 5, a pedestal, shown as pedestal 402, is attached to the first end 404 of the torque box 400. In one embodiment, the pedestal 402 is disposed rearward of (i.e., behind, etc.) the single rear axle 18. The pedestal 402 couples the turntable 300 to the torque box 400. The turntable 300 rotatably couples the first end 202 of the aerial ladder assembly 200 to the pedestal 402 such that the aerial ladder assembly 200 is selectively repositionable into a plurality of operating orientations. According to the exemplary embodiment shown in FIGS. 3-4, a single set of outriggers, shown as outriggers 100, includes a first outrigger 110 and a second outrigger 120. As shown in FIGS. 3-4, the first outrigger 110 and the second outrigger 120 are attached to the second end 406 of the torque box 400 in front of the single rear axle 18 and disposed on opposing lateral sides of the fire apparatus 10. As shown in FIGS. 1-4, the outriggers 100 are moveably coupled to the torque box 400 and may extend outward, away from the longitudinal axis 14, and parallel to a lateral axis 24. According to an exemplary embodiment, the outriggers 100 extend to a distance of eighteen feet (e.g., measured between the center of a pad of the first outrigger 110 and the center of a pad of the second outrigger 120, etc.). In other embodiments, the outriggers 100 extend to a distance of less than or greater than eighteen feet. An actuator may be positioned to extend portions of each of the first outrigger 110 and the second outrigger 120 towards the ground. The actuator may be a linear actuator, a rotary actuator, or still another type of device and may be powered hydraulically, electrically, or still otherwise powered.

According to the exemplary embodiment shown in FIGS. 3-5, a stability foot, shown as stability foot 130, is attached to the first end 404 of the torque box 400. An actuator (e.g., a linear actuator, a rotary actuator, etc.) may be positioned to extend a portion of the stability foot 130 towards the ground. Both the outriggers 100 and the stability foot 130 are used to support the fire apparatus 10 (e.g., while stationary and in use to fight fires, etc.). According to an exemplary embodiment, with the outriggers 100 and stability foot 130 extended, the fire apparatus 10 can withstand a tip capacity of at least 750 pounds applied to the last rung on the second end 204 of the aerial ladder assembly 200 while fully extended (e.g., to provide a horizontal reach of at least 90 feet, to provide a horizontal reach of at least 100 feet, to provide a vertical extension height of at least 95 feet, to provide a vertical extension height of at least 105 feet, to provide a vertical extension height of at least 107 feet, etc.). The outriggers 100 and the stability foot 130 are positioned to transfer the loading from the aerial ladder assembly 200 to the ground. For example, a load applied to the aerial ladder assembly 200 (e.g., a fire fighter at the second end 204, a wind load, etc.) may be conveyed into to the turntable 300, through the pedestal 402 and the torque box 400, and into the ground through at least one of the outriggers 100 and the stability foot 130. While the fire apparatus 10 is being driven or not in use, the actuators of the first outrigger 110, the second outrigger 120, and the stability foot 130 may retract portions of the outriggers 100 and the stability foot 130 into a stored position.

Figure 10:
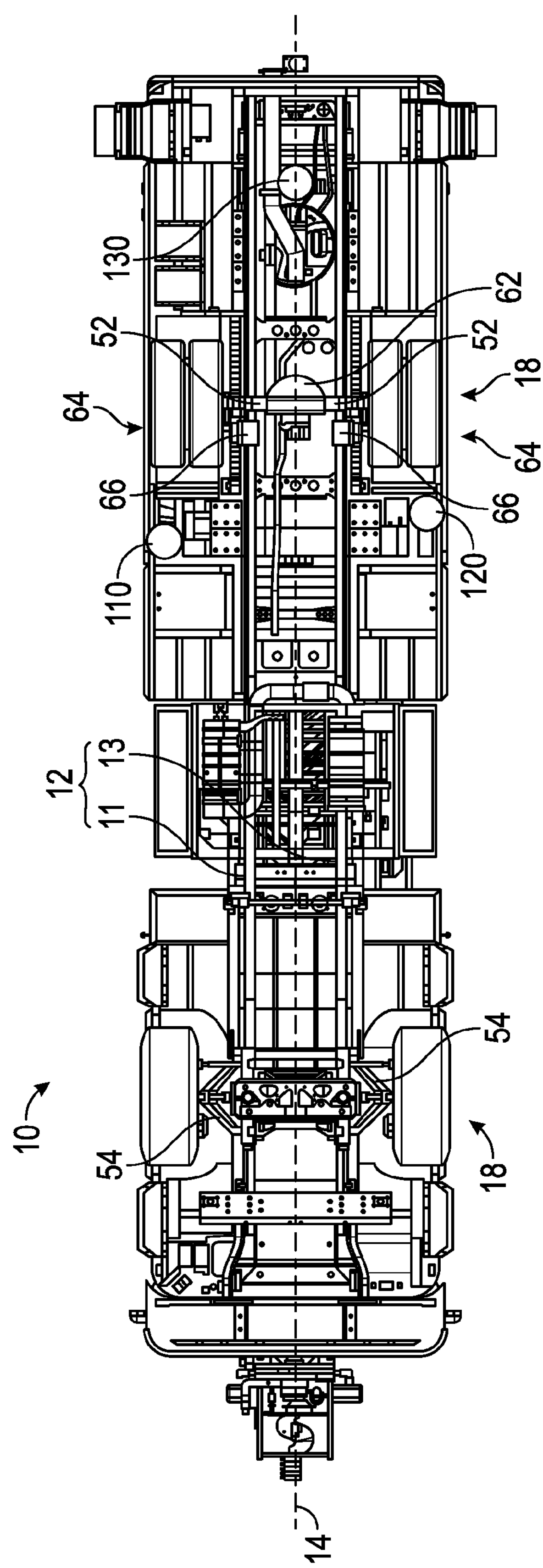
FIG. 10 is a bottom view of the fire apparatus of FIG. 1, according to an exemplary embodiment.
Figure 11:
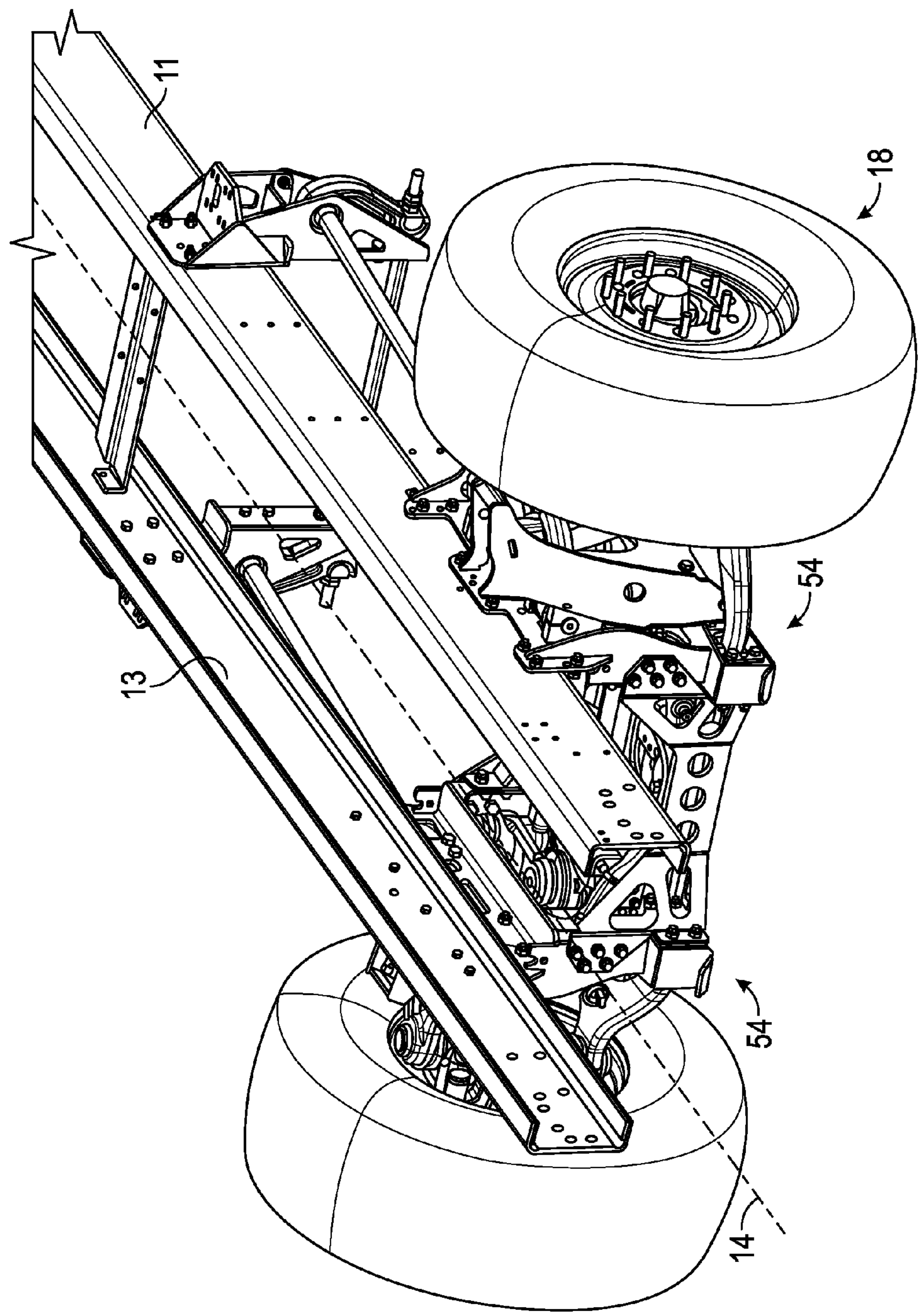
FIG. 11 is a perspective view of a front suspension of the fire apparatus of FIG. 1, according to an exemplary embodiment.
Figure 12:
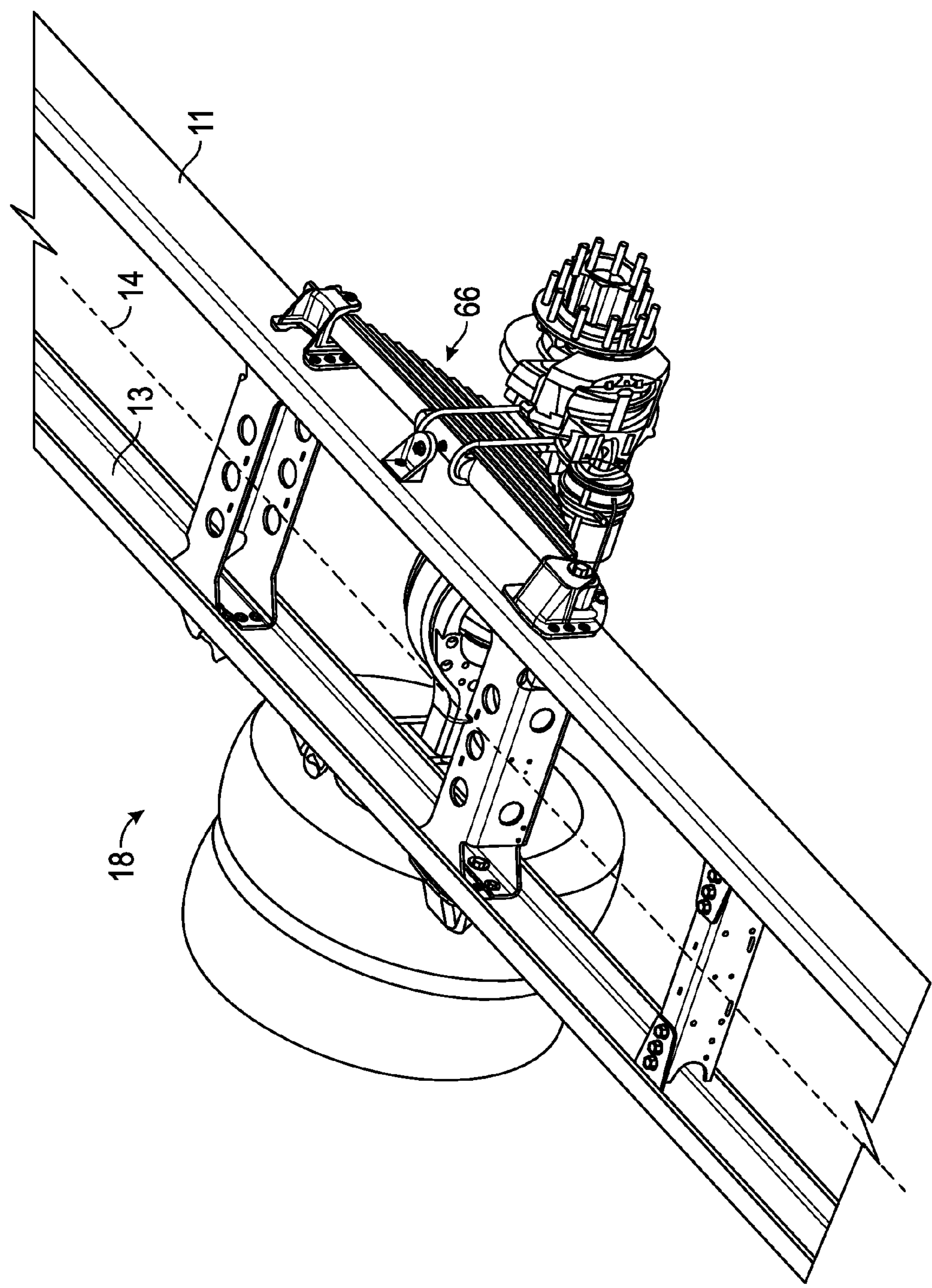
FIG. 12 is a perspective view of a rear suspension of the fire apparatus of FIG. 1, according to an exemplary embodiment.

As shown in FIGS. 10 and 12, the single rear axle 18 includes a differential 62 coupled to a pair of hub assemblies 64 with a pair of axle shaft assemblies 52. As shown in FIGS. 10 and 12, the single rear axle 18 includes a solid axle configuration extending laterally across the frame 12 (e.g., chassis, etc.). A rear suspension, shown as rear suspension 66, includes a pair of leaf spring systems. The rear suspension 66 may couple the single solid axle configuration of the single rear axle 18 to the frame 12. In one embodiment, the single rear axle 18 has a gross axle weight rating of no more than (i.e., less than or equal to, etc.) 33,500 pounds. In other embodiments, a first axle shaft assembly 52 has a first set of constant velocity joints and a second axle shaft assembly 52 has a second set of constant velocity joints. The first axle assembly 52 and the second axle assembly 52 may extend from opposing lateral sides of the differential 62, coupling the differential 62 to the pair of hub assemblies 64. As shown in FIGS. 10-11, a front suspension, shown as front suspension 54, for the front axle 18 includes a pair of independent suspension assemblies. In one embodiment, the front axle 18 has a gross axle weight rating of no more than 33,500 pounds.

According to the exemplary embodiment shown in FIGS. 1-12, the aerial ladder assembly 200 forms a cantilever structure when at least one of raised vertically and extended horizontally. The aerial ladder assembly 200 is supported by the cylinders 56 and by the turntable 300 at the first end 202. The aerial ladder assembly 200 supports static loading from its own weight, the weight of any equipment coupled to the ladder (e.g., the nozzle 38, a water line coupled to the nozzle, a platform, etc.), and the weight of any persons using the ladder. The aerial ladder assembly 200 may also support various dynamic loads (e.g., due to forces imparted by a fire fighter climbing the aerial ladder assembly 200, wind loading, loading due to rotation, elevation, or extension of aerial ladder assembly, etc.). Such static and dynamic loads are carried by the aerial ladder assembly 200. The forces carried by the cylinders 56, the turntable 300, and the frame 12 may be proportional (e.g., directly proportional, etc.) to the length of the aerial ladder assembly 200. At least one of the weight of the aerial ladder assembly 200, the weight of the turntable 300, the weight of the cylinders 56, and the weight of the torque box 400 is traditionally increased to increase at least one of the extension height rating, the horizontal reach rating, the static load rating, and the dynamic load rating. Such vehicles traditionally require the use of a chassis having a tandem rear axle. However, the aerial ladder assembly 200 of the fire apparatus 10 has an increased extension height rating and horizontal reach rating without requiring a chassis having a tandem rear axle (e.g., a tandem axle assembly, etc.). According to the exemplary embodiment shown in FIGS. 1-12, the fire apparatus 10 having a single rear axle 18 is lighter, substantially less difficult to maneuver, and less expensive to manufacture than a fire apparatus having a tandem rear axle.

Figure 13:
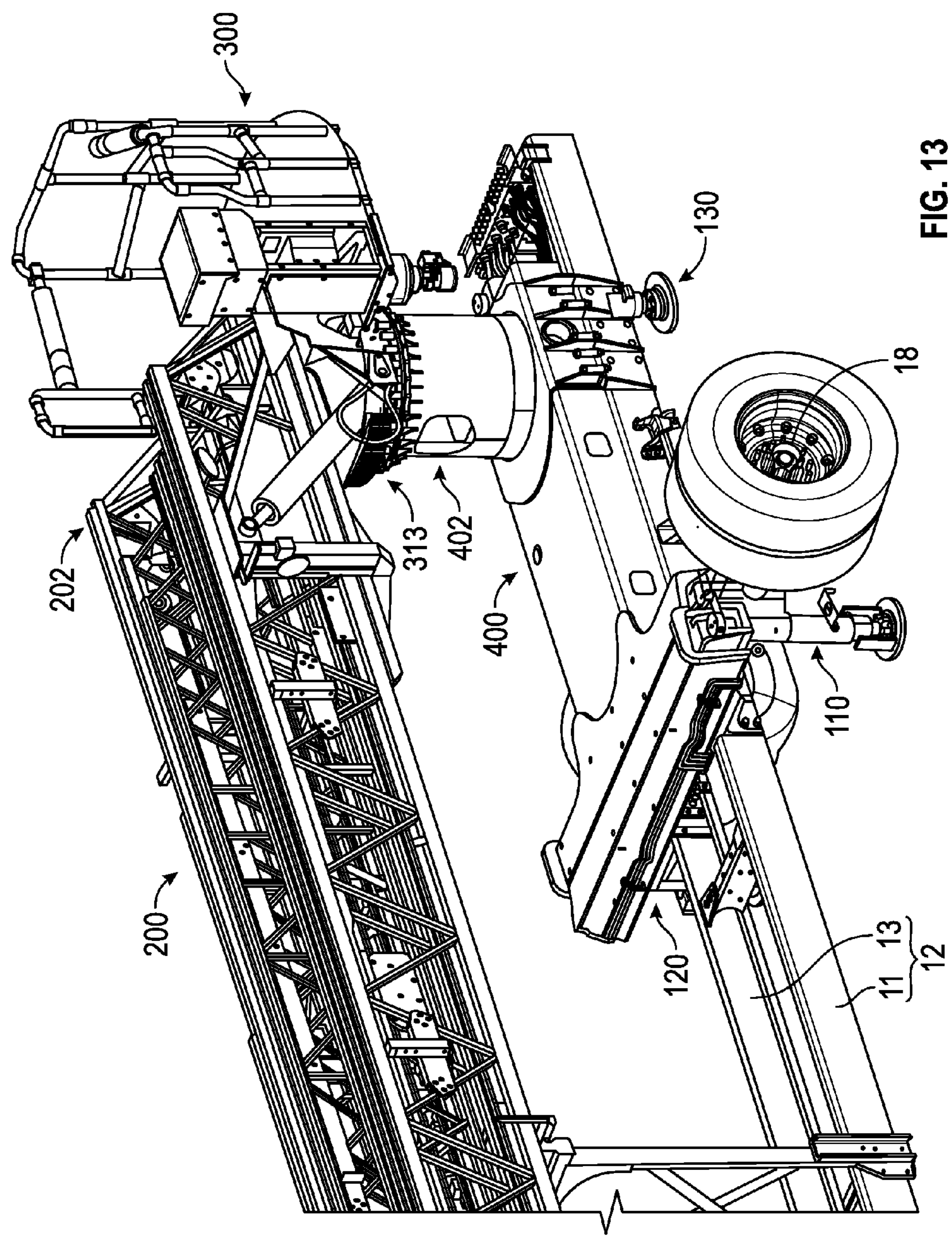
FIG. 13 is a front perspective view of a pedestal, a torque box, a turntable, and an aerial ladder assembly of a fire apparatus, according to an exemplary embodiment.

According to the exemplary embodiment shown in FIGS. 13-22, the turntable 300 includes various components to both operate the aerial ladder assembly 200 and transfer the loading from the aerial ladder assembly 200 to the frame 12 of the fire apparatus 10. As shown in FIG. 13, the first end 202 of aerial ladder assembly 200 is coupled to the turntable 300. The turntable 300 is coupled to the frame 12 with the pedestal 402.

Figure 14:
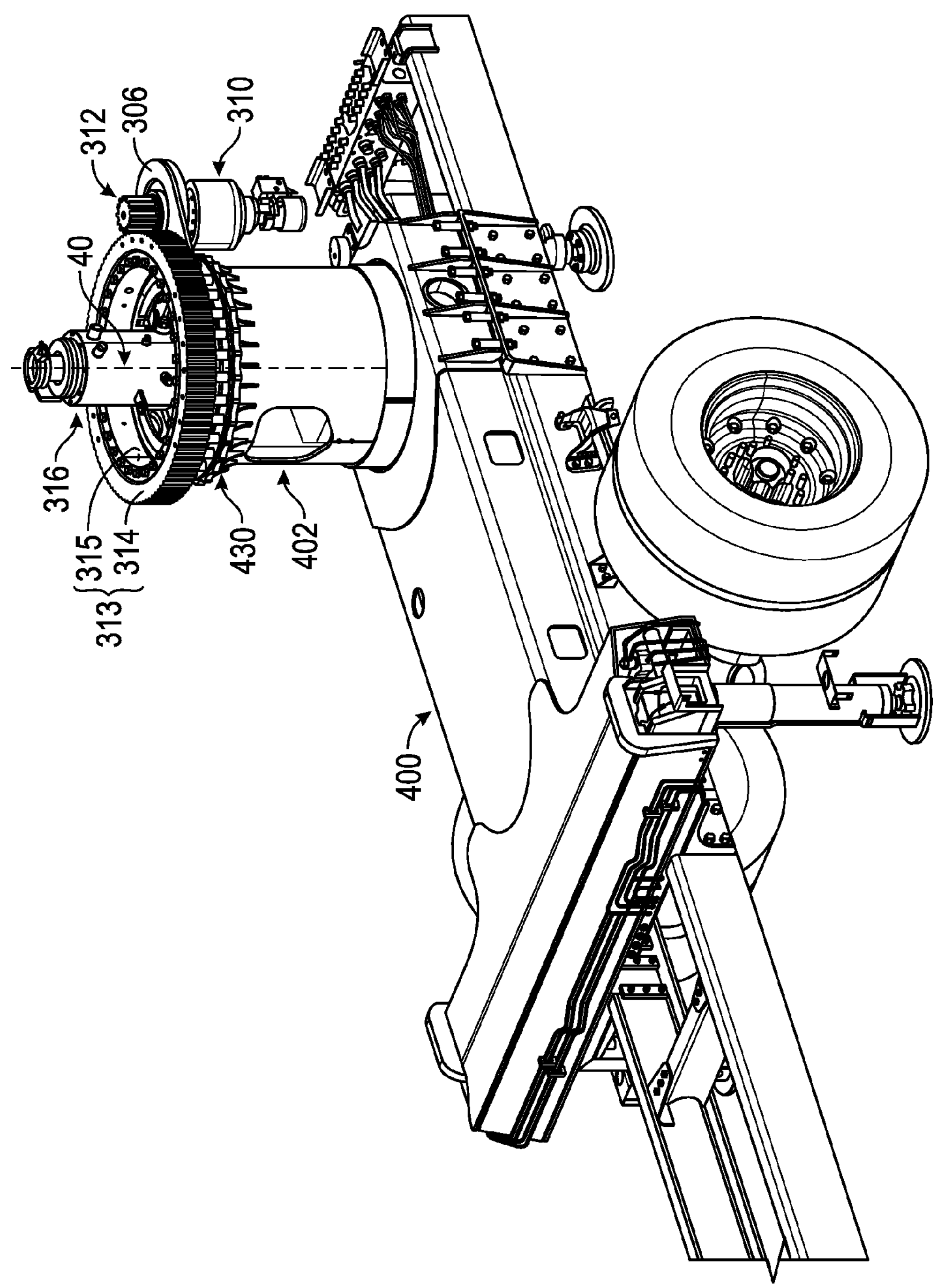
FIG. 14 is a front perspective view of a connector associated with the turntable of FIG. 13, according to an exemplary embodiment.
Figure 15:
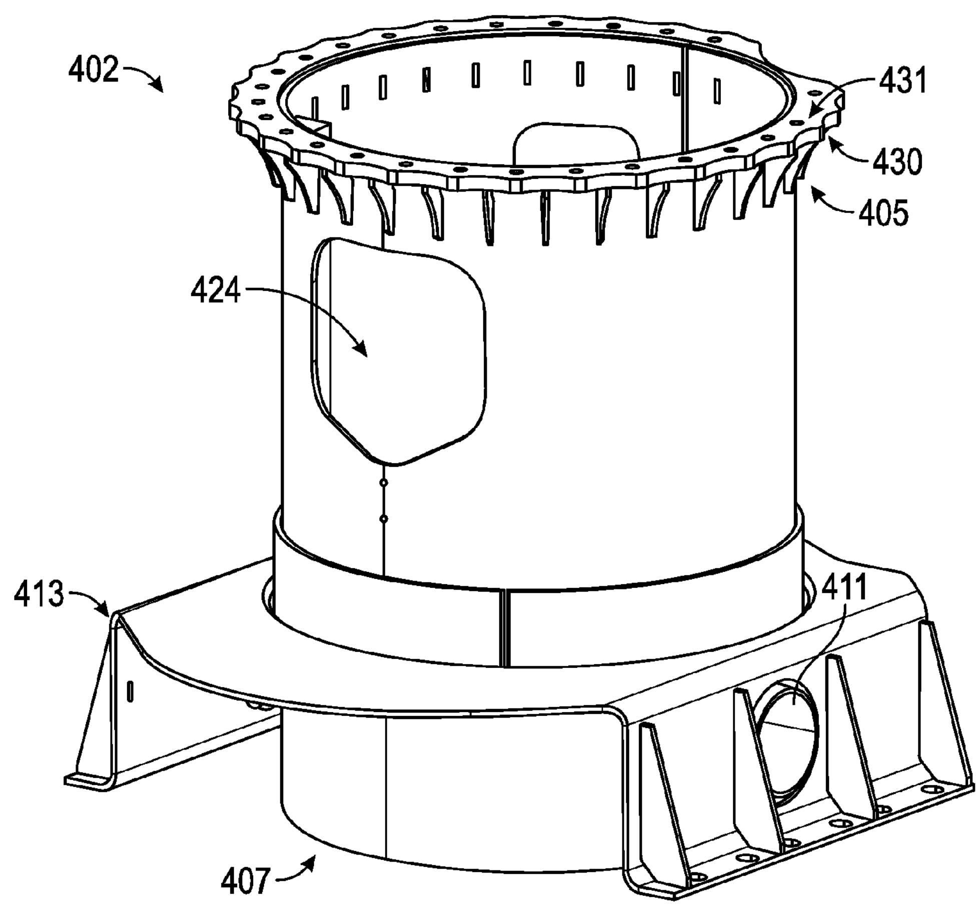
FIG. 15 is a perspective view of the pedestal of FIG. 13, according to an exemplary embodiment.
Figure 16:
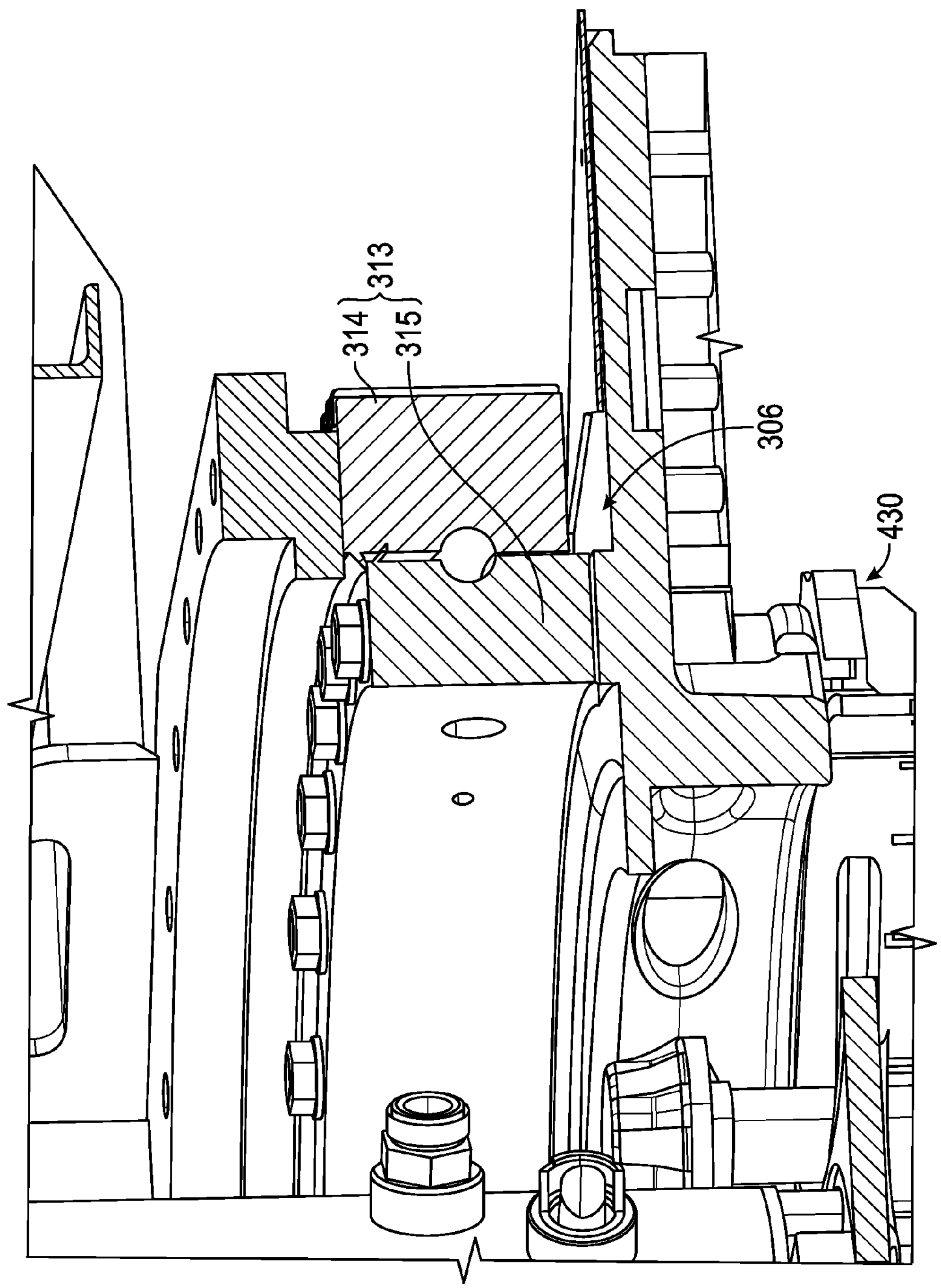
FIG. 16 is a cross-sectional view of the connector of FIG. 14, according to an exemplary embodiment.
Figure 20:
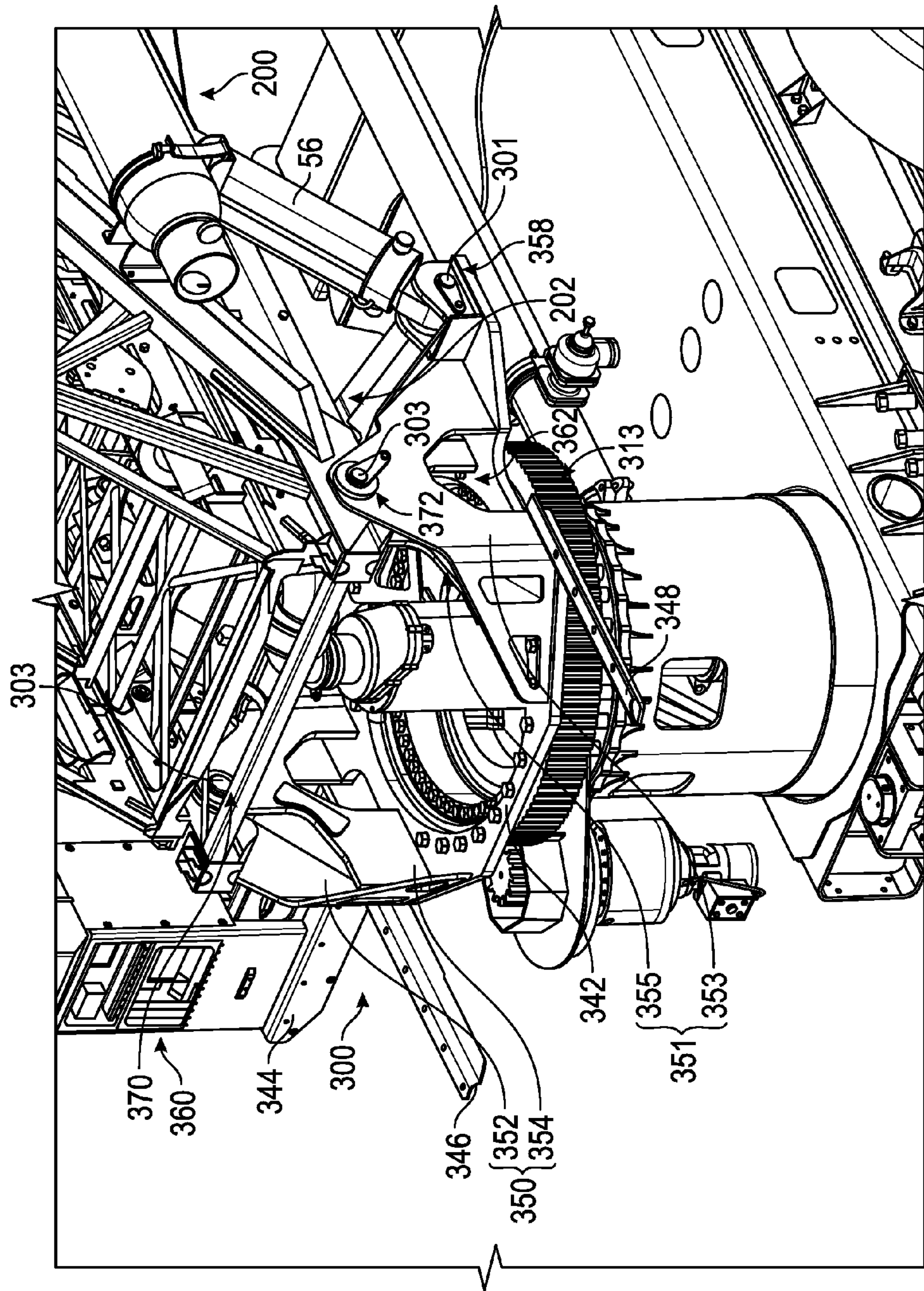
FIG. 20 is a rear perspective view of the connection between the pedestal, the aerial ladder assembly, and the turntable of FIG. 13, according to an exemplary embodiment.

Referring to the exemplary embodiment shown in FIGS. 13-16 and 20, the turntable 300 is rotatably coupled to the pedestal 402. As shown in FIG. 13, a connector, shown as slewing bearing 313, is disposed between the turntable 300 and the pedestal 402. As shown in FIGS. 14 and 16, the slewing bearing 313 is a rotational rolling-element bearing with an outer element, shown as driven gear 314, and an inner element, shown as bearing element 315. The bearing element 315 is coupled to a plate, shown as plate 306, via a plurality of fasteners (e.g., bolts, etc.). As shown in FIG. 15, a flange, shown as flange 430, is disposed at a top end 405 of the pedestal 402. The flange 430 defines a plurality of holes 431 positioned around the perimeter of pedestal 402. As shown in FIGS. 14-16, the flange 430 provides a surface that abuts the plate 306. The plurality of fasteners coupling the plate 306 to the bearing element 315 may engage with the plurality of holes 431 thereby securing the bearing element 315 and the plate 306 to the pedestal 402. As shown in FIG. 14, the driven gear 314 includes a plurality of apertures. As shown in FIG. 20, turntable 300 includes a base plate, shown as base plate 342. The base plate 342 is a superstructure that defines a plurality of apertures that correspond with those defined by the driven gear 314, fasteners associated therewith coupling the turntable 300 and the driven gear 314. In other embodiments, the connector associated with the turntable 300 and the pedestal 402 includes another rotational element which allows rotation of one element (e.g., the turntable 300, etc.) relative to another element (e.g., the pedestal 402, frame 12, etc.).

As shown in FIG. 14, a drive member, shown as motor 310, is coupled to the plate 306. The motor 310 may actuate (e.g., rotate, turn, etc.) the turntable 300. In one embodiment, the motor 310 is an electric motor (e.g., an alternating current (AC) motor, a direct current motor (DC), etc.) configured to convert electrical energy into mechanical energy. In other embodiments, the motor 310 is powered by air (e.g., pneumatic, etc.), a fluid (e.g., a hydraulic cylinder, etc.), mechanically (e.g., a flywheel, etc.), or another source.

As shown in FIG. 14, the motor 310 includes a driving element, shown as drive pinion 312. The drive pinion 312 is mechanically coupled with the driven gear 314 of the slewing bearing 313. In one embodiment, a plurality of teeth on the drive pinion 312 engage a plurality of teeth on the driven gear 314. By way of example, when the motor 310 is actuated (e.g., powered, turned on, etc.), the motor 310 may provide rotational energy (i.e., mechanical energy, etc.) to a motor output shaft. The drive pinion 312 may be coupled to the motor output shaft such that the rotational energy of the motor output shaft drives (e.g., rotates, etc.) the drive pinion 312. The rotational energy of the drive pinion 312 may be transferred to the driven gear 314 via the engaging teeth of both the drive pinion 312 and the driven gear 314. The driven gear 314 rotates about the vertical axis 40, while the bearing element 315 remains in a fixed position relative to the driven gear 314. In embodiments where the base plate 342 of the turntable 300 is coupled to the driven gear 314, the turntable 300 and the aerial ladder assembly 200 rotate with the driven gear 314. In one embodiment, the slewing bearing 313 allows the turntable 300 and aerial ladder assembly 200 to rotate a full 360 degrees. In other embodiments, the turntable 300 is fixed to the pedestal 402 (i.e., cannot rotate, etc.).

Figure 17:
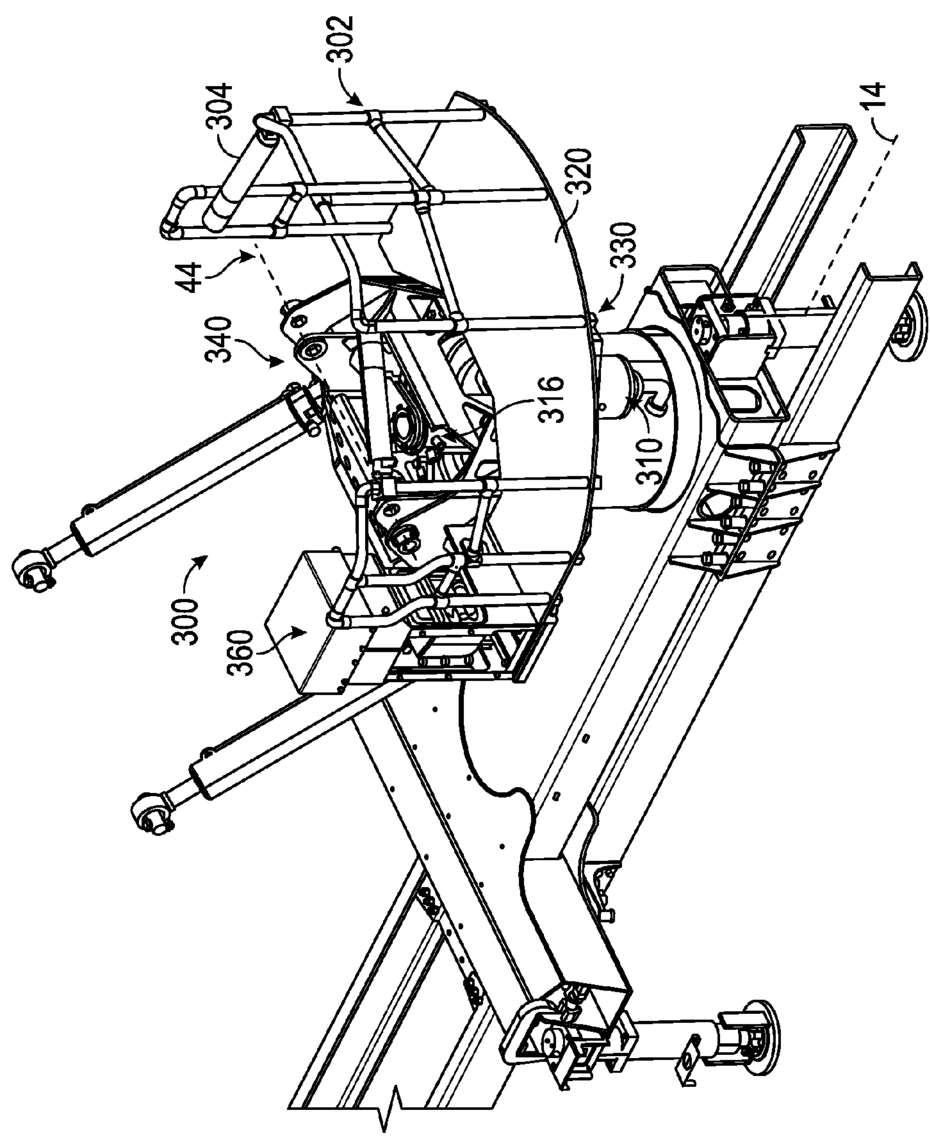
FIG. 17 is a rear perspective view of the turntable of FIG. 13, according to an exemplary embodiment.
Figure 18:
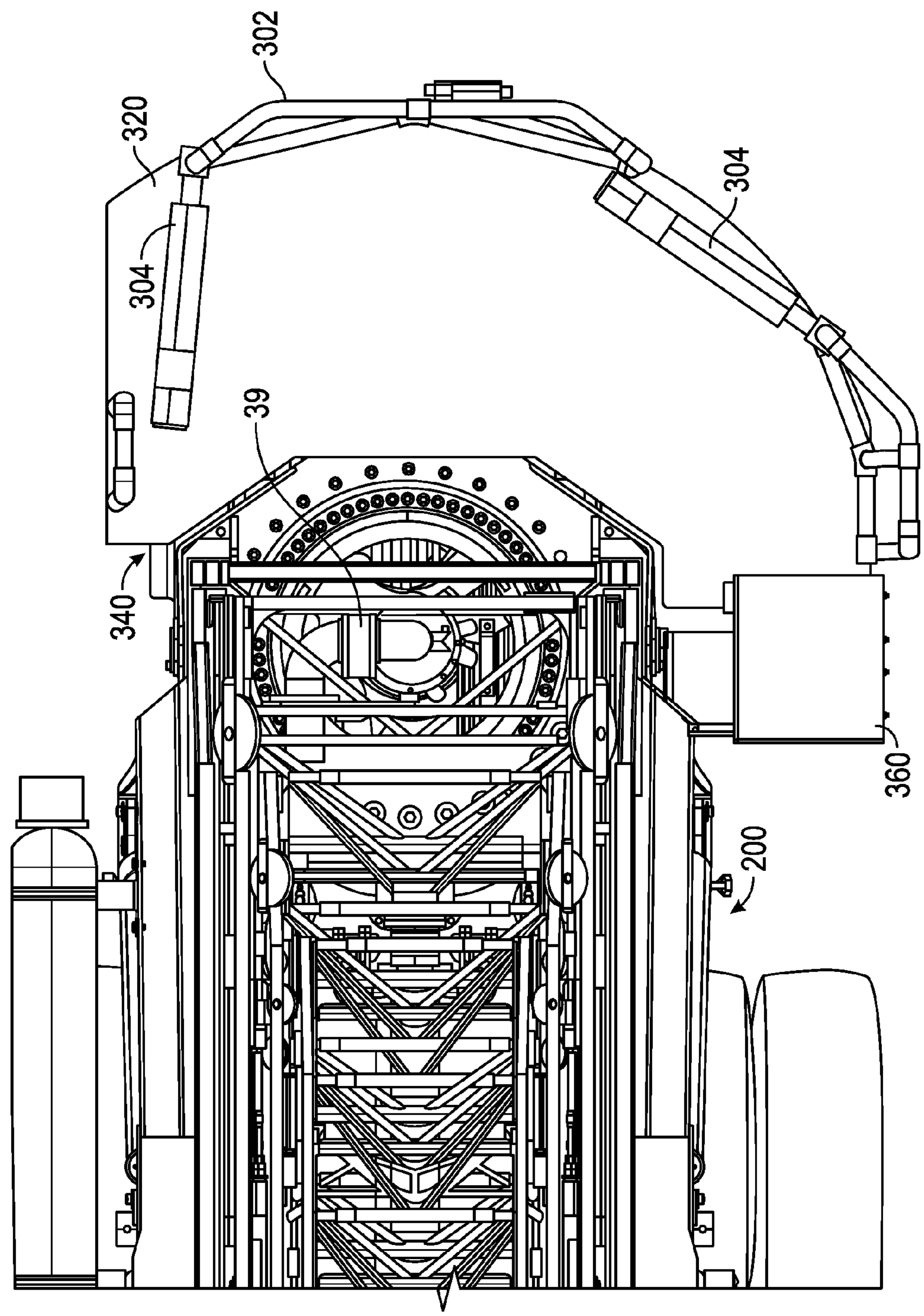
FIG. 18 is a top view of the turntable of FIG. 13, according to an exemplary embodiment.

As shown in FIGS. 14 and 17, a rotation swivel, shown as rotation swivel 316, includes a hollow tube that extends upward from the pedestal 402 and into the turntable 300. The rotation swivel 316 couples (e.g., electrically, hydraulically, etc.) the aerial ladder assembly 200 with other components of fire apparatus 10. By way of example, the hollow tube may define a passageway for water to flow into the aerial ladder assembly 200. Various lines may provide electricity, hydraulic fluid, and water to the aerial ladder assembly 200, the cylinders 56, and the turntable 300. As shown in FIGS. 1 and 18, the nozzle 38 is connected to a water source (e.g., the water tank 58, an external source, etc.) via an intermediate conduit, shown as conduit 39. Conduit 39 extends along the aerial ladder assembly 200 to the rotation swivel 316, according to the exemplary embodiment shown in FIG. 18. The conduit 39 receives water from at least one of the water tank 58 and an external source (e.g., a fire hydrant, etc.) providing water to the nozzle 38.

As shown in FIGS. 17-20, the turntable 300 includes a work platform, shown as work platform 320. Work platform 320 may provide a surface upon which operators (e.g., fire fighters, rescue workers, etc.) may stand while operating the aerial ladder assembly 200 via an input/output (I/O) device, shown as a control console 360. The control console 360 is communicably coupled to various components of the fire apparatus 10 (e.g., the aerial ladder assembly 200, the turntable 300, hydraulic lines, hydraulic pumps, etc.), such that information or signals (e.g., command signals, fluid control, etc.) may be exchanged from the control console 360. The information or signals may relate to one or more components of the fire apparatus 10. According to an exemplary embodiment, the control console 360 enables an operator (e.g., fire fighter, etc.) of the fire apparatus 10 to communicate with one or more components of the fire apparatus 10. By way of example, the control console 360 may include at least one of an interactive display, a touchscreen device, one or more buttons (e.g., a stop button configured to cease water flow through nozzle 38, etc.), joysticks, switches, and voice command receivers. An operator may use a joystick associated with the control console 360 to trigger the actuation of the motor 310 thereby rotating the turntable 300 and aerial ladder assembly 200 to a desired angular position (e.g., to the front, back, or side of fire apparatus 10, etc.). By way of another example, an operator may engage a lever associated with the control console 360 to trigger the extension or retraction of the plurality of sections of the aerial ladder assembly 200.

Figure 19:
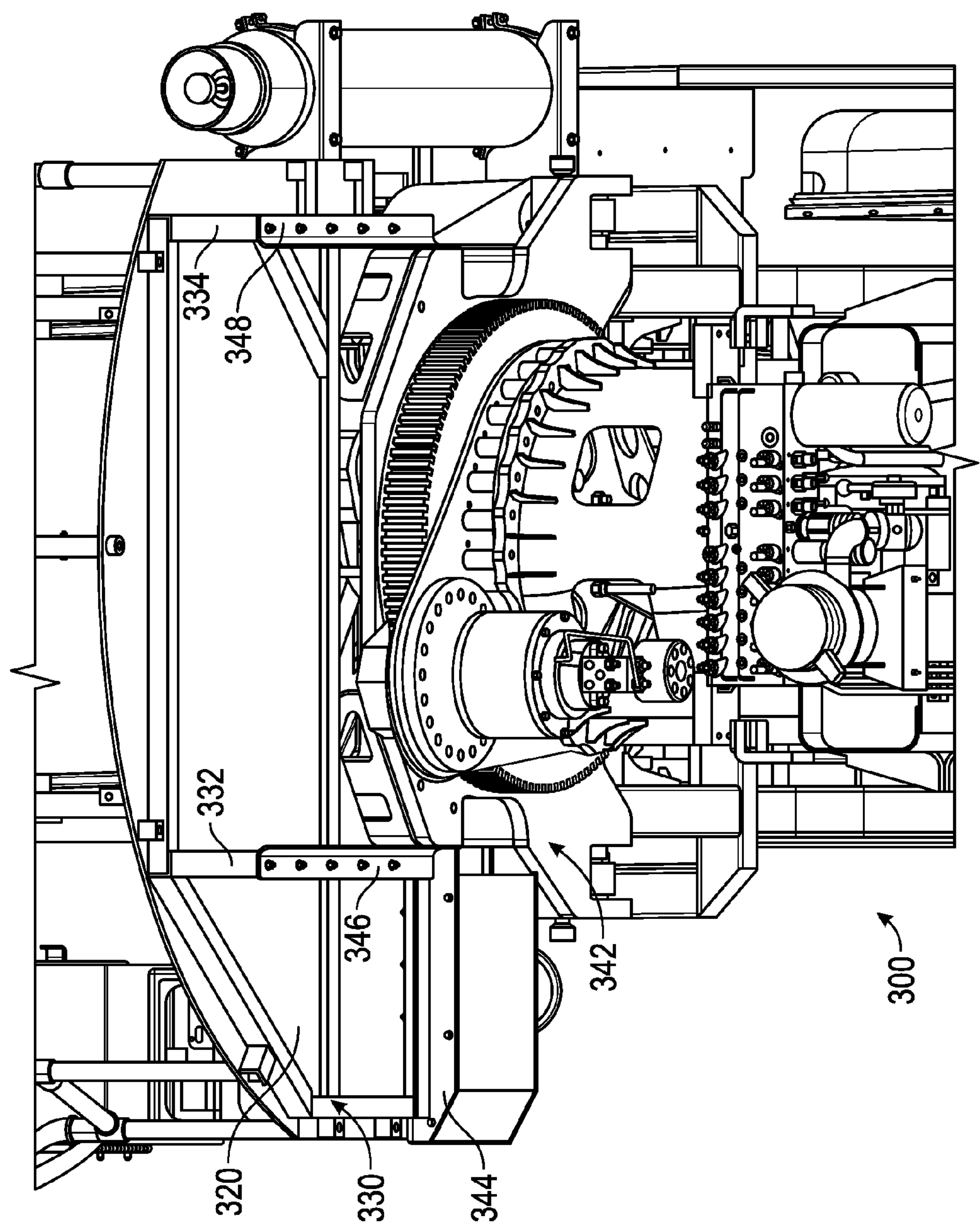
FIG. 19 is a bottom perspective view of the turntable of FIG. 13, according to an exemplary embodiment.

As shown in FIGS. 17 and 19, an underside of the work platform 320 is coupled to a subfloor assembly, shown as truss assembly 330. In one embodiment, the hand rails 302 are coupled to the truss assembly 330 at a plurality of interfaces. The work platform 320 may be an aluminum plate having a thickness of no more than 0.5 inches (i.e., a thickness less than or equal to 0.5 inches, etc.). In other embodiments, the work platform 320 is manufactured using another material or has another thickness. The work platform of a traditional fire apparatus is constructed from thick steel plates thereby increasing the weight of the turntable to provide a desired increase in at least one of the extension height and the horizontal reach of the ladder assembly associated therewith. Work platform 320 may have a weight of less than half the weight of traditional work platforms. In one embodiment, the truss assembly 330 strengthens work platform 320 and provides an interface that couples work platform 320 to the various other components of turntable 300. Truss assembly 330 may carry the various loads applied to work platform 320 into turntable 300. As shown in FIG. 19, the truss assembly 330 includes a first frame member, shown as first truss 332, and a second frame member, shown as second truss 334. As shown in FIGS. 17 and 19, the first truss 332 is parallel to the second truss 334. The first truss 332 and the second truss 334 extend along a longitudinal direction (e.g., defined by the longitudinal axis 14, defined by the aerial ladder assembly 200, etc.), according to an exemplary embodiment.

As shown in FIG. 20, the turntable 300 includes the base plate 342, a first set of side plates 350, and a second set of side plates 351. The first set of side plates 350 includes a first outer plate 352 and a first inner plate 354. The second set of side plates 351 includes a second outer plate 353 and a second inner plate 355. As shown in FIG. 20, the first outer plate 352, the first inner plate 354, the second outer plate 353, and the second inner plate 355 each define an aperture 362. The aperture 362 may reduce the overall weight of the turntable 300 while providing access to an inner portion thereof (e.g., for maintenance, as a passageway for lines, etc.). The first outer plate 352 and the second outer plate 353 both define various other apertures in addition to aperture 362 thereby further reducing the weight of the turntable 300.

As shown in FIGS. 19-20, a first bracket, shown as first bracket 346, and a second bracket, shown as second bracket 348, are coupled to the base plate 342. In one embodiment, first bracket 346 and second bracket 348 are coupled to opposing lateral sides of the base plate 342. As shown in FIGS. 19-20, both the first bracket 346 and the second bracket 348 extend along the longitudinal direction (e.g., defined by the aerial ladder assembly 200, etc.). As shown in FIG. 19, the truss assembly 330 is coupled to the first bracket 346 and the second bracket 348. In one embodiment, the first truss 332 and the second truss 334 are releasably coupled to the first bracket 346 and the second bracket 348, respectively, with a plurality of fasteners (e.g., bolts, etc.). In other embodiments, truss assembly 330 is otherwise coupled to base plate 342. According to the exemplary embodiment shown in FIGS. 19-20, the turntable 300 includes a third bracket, shown as console bracket 344. The console bracket 344 extends laterally outward from the base plate 342, perpendicular to the longitudinal direction (e.g., defined by the aerial ladder assembly 200, etc.). In other embodiments, the console bracket 344 is otherwise positioned. The console bracket 344 may be configured to engage the control console 360 (e.g., may provide a surface to which the control console 360 is coupled, etc.).

Figure 21:
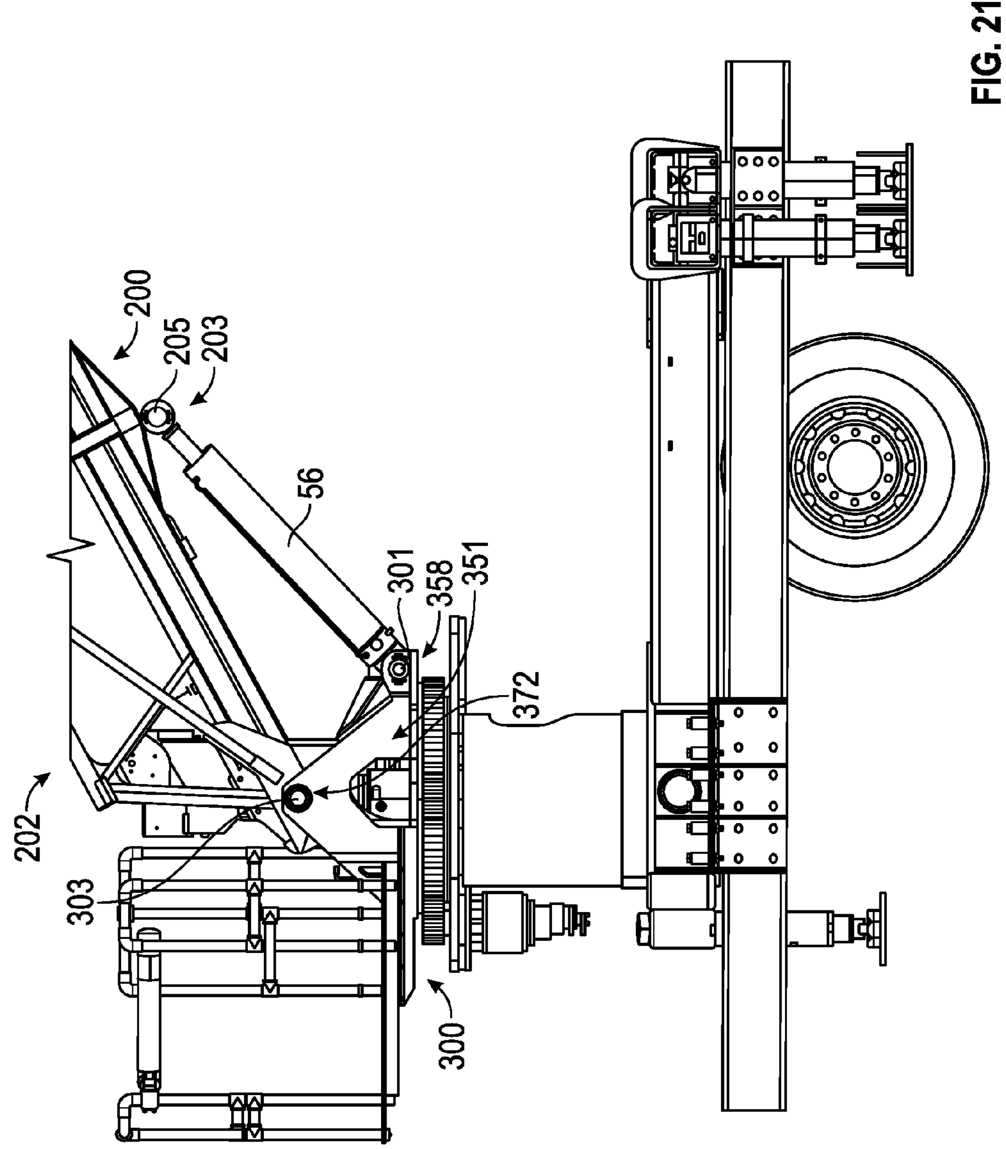
FIG. 21 is a right side view of turntable of FIG. 13, according to an exemplary embodiment.
Figure 22:
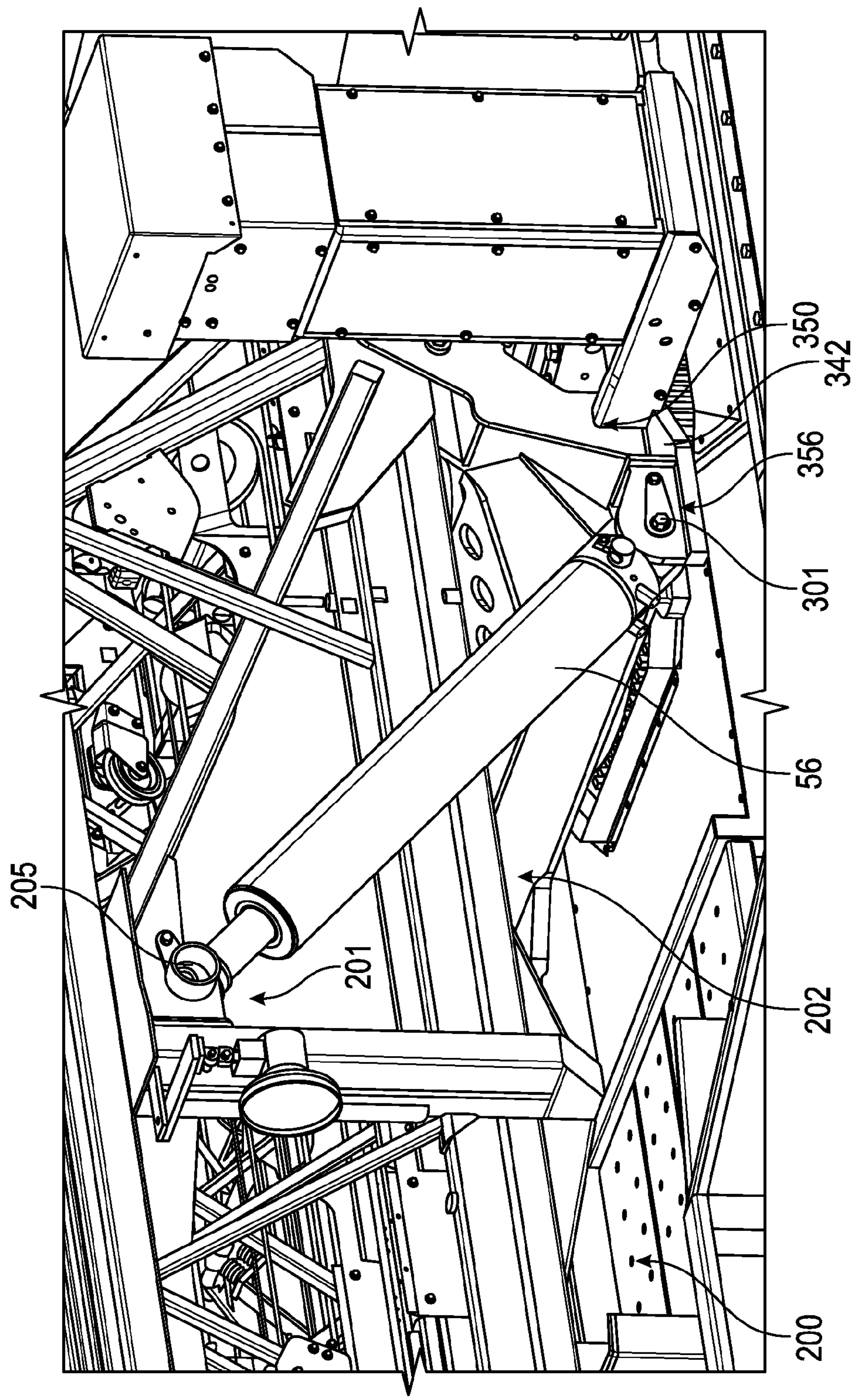
FIG. 22 is a left side perspective view of the connection between the turntable and the aerial ladder assembly of FIG. 13, according to an exemplary embodiment.

Referring to the exemplary embodiment shown in FIGS. 20-22, the first end 202 of the aerial ladder assembly 200 is coupled to the turntable 300 at four connection points. As shown in FIGS. 20-22, two of the connection points are disposed on a first lateral side of the fire apparatus 10 and two of the connection points are disposed on a second lateral side of the fire apparatus 10. As shown in FIG. 20, the first end 202 of the aerial ladder assembly 200 is coupled to the first set of side plates 350 at a first connection, shown as connection 370. A pin, shown as first heel pin 303, is positioned to engage and rotatably couple the aerial ladder assembly 200 to the first set of side plates 350 at the connection 370. As shown in FIG. 20-21, the first end 202 of the aerial ladder assembly 200 is coupled to the second set of side plates 351 at a second connection, shown as connection 372. A second heel pin 303 is positioned to engage and rotatably couple the aerial ladder assembly 200 to the second set of side plates 351 at the connection 372.

As shown in FIG. 22, an end of the cylinder 56 is coupled to the first end 202 of the aerial ladder assembly 200 at a point 201. A second pin, shown as first ladder pin 205, engages and rotatably couples the end the cylinder 56 to the aerial ladder assembly 200 at the point 201. As shown in FIGS. 20-22, the base plate 342 defines a first arm, shown as first arm 356, and a second arm, shown as second arm 358. As shown in FIG. 22, an opposing end of the cylinder 56 is coupled to the turntable 300 at a third connection disposed along the first arm 356. A third pin, shown as first base pin 301, is positioned to engage and rotatably couple the opposing end of the cylinder 56 to the first arm 356. As shown in FIG. 21, an end of the cylinder 56 on the opposing lateral side of the fire apparatus 10 is coupled to the first end 202 of the aerial ladder assembly 200 at a point 203. A second ladder pin 205, is positioned to engage and rotatably couple the end of the cylinder 56 to the aerial ladder assembly 200 at the point 203. As shown in FIGS. 20-21, an opposing end of the cylinder 56 is coupled to the turntable 300 at a fourth connection disposed along second arm 358. A second base pin 301 is positioned to engage and rotatably couple the opposing end of the cylinder 56 to the second arm 358. According to an exemplary embodiment, the cylinders 56 are actuated using the control console 360. When actuated, the cylinders 56 may at least one of extend and retract to rotate the aerial ladder assembly 200 about the heel pins 303.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A quint configuration fire apparatus, comprising:
a chassis;
a pump and a water tank coupled to the chassis;
a body assembly coupled to the chassis and having a storage area configured to receive a ground ladder and a fire hose;
a ladder assembly including a plurality of extensible ladder sections, the ladder assembly coupled to the chassis with a turntable including a base plate, a first set of side plates, and a second set of side plates, wherein the ladder assembly is coupled to the first set of side plates at a first connection and the second set of side plates at a second connection, wherein the turntable includes a first bracket and a second bracket coupled to the base plate, wherein the ladder assembly is extensible to provide a horizontal reach of at least 100 feet and a vertical height of at least 105 feet;
a single front axle coupled to a front end of the chassis; and
a single rear axle coupled to a rear end of the chassis, wherein the turntable includes a work platform coupled to a subfloor assembly such that a loaded weight of the quint configuration fire apparatus is supportable by the single front axle and the single rear axle, wherein the subfloor assembly is releasably coupled to the first bracket and the second bracket with a plurality of fasteners.

2. The quint configuration fire apparatus of claim 1, further comprising a first actuator and a second actuator each having an end coupled to the ladder assembly, wherein the base plate defines a first arm and a second arm, and wherein the first actuator and the second actuator each have an opposing end coupled to the base plate along the first arm and the second arm, respectively.

3. The quint configuration fire apparatus of claim 1, wherein the subfloor assembly includes a first frame member and a second frame member, and wherein the first frame member and the second frame member are releasably coupled to the first bracket and the second bracket, respectively, with the plurality of fasteners.

4. The quint configuration fire apparatus of claim 3, wherein the first frame member, the second frame member, the first bracket, and the second bracket extend along a longitudinal direction defined by the ladder assembly.

5. The quint configuration fire apparatus of claim 4, further comprising a third bracket configured to engage a control console and extending laterally outward from the base plate, perpendicular to the longitudinal direction defined by the ladder assembly.

6. The quint configuration fire apparatus of claim 3, wherein the turntable includes a railing assembly coupled to the subfloor assembly at a plurality of interfaces.

7. The quint configuration fire apparatus of claim 3, wherein the work platform comprises an aluminum plate having a thickness of no more than 0.5 inches.

8. The quint configuration fire apparatus of claim 3, wherein the turntable is rotatably coupled to the chassis with a slewing bearing disposed rearward of the single rear axle.

9. The quint configuration fire apparatus of claim 3, wherein the single rear axle comprises a solid axle configuration extending laterally across the chassis.

10. The quint configuration fire apparatus of claim 9, wherein the single rear axle has a gross axle weight rating of no more than 33,500 pounds.

11. A fire apparatus, comprising:

a chassis;

a body assembly coupled to the chassis and configured to receive a ground ladder, a fire hose, a pump, and a water tank;

a ladder assembly including a plurality of extensible ladder sections, the ladder assembly coupled to the chassis with a turntable including a base plate, a first set of side plates, and a second set of side plates, wherein the ladder assembly is coupled to the first set of side plates at a first connection and the second set of side plates at a second connection, wherein the turntable includes a first bracket and a second bracket coupled to the base plate, wherein the ladder assembly is extensible to provide a horizontal reach of at least 100 feet;

a single front axle coupled to a front end of the chassis; and a single rear axle coupled to a rear end of the chassis, wherein the turntable includes a work platform coupled to a subfloor assembly such that a loaded weight of the fire apparatus is supportable by the single front axle and the single rear axle, wherein the subfloor assembly is releasably coupled to the first bracket and the second bracket with a plurality of fasteners.

12. The fire apparatus of claim 11, wherein the turntable includes a railing assembly coupled to the subfloor assembly at a plurality of interfaces.

13. The fire apparatus of claim 12, wherein the work platform comprises an aluminum plate having a thickness of no more than 0.5 inches.

14. The fire apparatus of claim 13, wherein the single rear axle comprises a solid axle configuration extending laterally across the chassis.

* * * * *